United States Patent
Nagata et al.

(10) Patent No.: US 10,449,636 B2
(45) Date of Patent: Oct. 22, 2019

(54) PIPELINE AND MANUFACTURING METHOD THEREOF

(71) Applicant: NIPPON STEEL & SUMITOMO METAL CORPORATION, Tokyo (JP)

(72) Inventors: Yukinobu Nagata, Tokyo (JP); Eiji Tsuru, Tokyo (JP); Yasuhiro Shinohara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 291 days.

(21) Appl. No.: 15/649,469

(22) Filed: Jul. 13, 2017

(65) Prior Publication Data

US 2017/0304953 A1 Oct. 26, 2017

Related U.S. Application Data

(62) Division of application No. 14/371,592, filed as application No. PCT/JP2013/051765 on Jan. 28, 2013, now Pat. No. 9,737,962.

(30) Foreign Application Priority Data

Jan. 27, 2012 (JP) ................................. 2012-014991

(51) Int. Cl.
*B23K 9/23* (2006.01)
*B23K 31/02* (2006.01)
(Continued)

(52) U.S. Cl.
CPC ............ *B23K 31/02* (2013.01); *C22C 38/001* (2013.01); *C22C 38/02* (2013.01); *C22C 38/04* (2013.01);
(Continued)

(58) Field of Classification Search
None
See application file for complete search history.

(56) References Cited

U.S. PATENT DOCUMENTS

| 5,134,267 A | 7/1992 | Atsumi et al. |
| 5,491,637 A | 2/1996 | Kraemer et al. |

(Continued)

FOREIGN PATENT DOCUMENTS

| EP | 2192203 A1 | 6/2010 |
| JP | 3-133576 A | 6/1991 |

(Continued)

OTHER PUBLICATIONS

International Search Report issued in PCT/JP2013/051765, dated Apr. 2, 2013.

(Continued)

*Primary Examiner* — Seth Dumbris
(74) *Attorney, Agent, or Firm* — Birch, Stewart, Kolasch & Birch, LLP

(57) ABSTRACT

A pipeline is a pipeline having plural weld zones in which ends of plural steel pipes are joined by welding, the plural steel pipes are produced from plural charges of molten steel having one or more steel compositions; yield point elongation is not present on a stress-strain curve obtained when stress is applied in a longitudinal direction of each of the steel pipes; a thickness of each of the steel pipes t (mm) and an average pipe outside-diameter D (mm) satisfy t/D×100≤6; and in the plurality of the weld zones, ΔYS which is a yield strength difference between one steel pipe and the other steel pipe that are welded to each other (MPa), and YR representing a yield ratio that is a ratio of the yield strength to tensile strength of a pipe having a low yield strength out of the one steel pipe and the other steel pipe, satisfy ΔYS≤−1.75×YR+230.

5 Claims, 3 Drawing Sheets

(51) Int. Cl.
*C22C 38/14* (2006.01)
*F16L 13/02* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/26* (2006.01)
*C22C 38/28* (2006.01)
*C22C 38/38* (2006.01)
*F16L 13/04* (2006.01)
*B23K 101/10* (2006.01)

(52) U.S. Cl.
CPC .............. *C22C 38/06* (2013.01); *C22C 38/12* (2013.01); *C22C 38/14* (2013.01); *C22C 38/26* (2013.01); *C22C 38/28* (2013.01); *C22C 38/38* (2013.01); *F16L 13/02* (2013.01); *F16L 13/04* (2013.01); *B23K 2101/10* (2018.08); *Y10T 428/12* (2015.01)

(56) References Cited

U.S. PATENT DOCUMENTS 8,007,603 B2   8/2011   Garcia et al.
8,715,430 B2 * 5/2014   Hara ....................... C22C 38/58
                                                    148/307
2013/0092280 A1   4/2013   Sawamura et al.

FOREIGN PATENT DOCUMENTS

| JP | 3-211255 A | 9/1991 |
| JP | 2001-192773 A | 7/2001 |
| JP | 2006-122932 A | 5/2006 |
| JP | 2006-281217 A | 10/2006 |
| WO | WO 2008/072970 A1 | 6/2008 |
| WO | WO 2012/144248 A1 | 10/2012 |

OTHER PUBLICATIONS

Extended European Search Report dated Dec. 15, 2015, for European Application No. 13740715.1.
Notice of Allowance dated Apr. 13, 2017 in co-pending U.S. Appl. No. 14/371,592.
Office Action dated Nov. 25, 2016 in co-pending U.S. Appl. No. 14/371,592.
Restriction/Election Requirement dated Apr. 21, 2016 in co-pending U.S. Appl. No. 14/371,592.

* cited by examiner

PIPELINE AND MANUFACTURING METHOD THEREOF

CROSS-REFERENCE TO RELATED APPLICATION

This application is a Divisional of co-pending U.S. application Ser. No. 14/371,592 filed on Jul. 10, 2014, which is the National Phase under 35 U.S.C. § 371 of International Application No. PCT/JP2013/051765 filed on Jan. 28, 2013, which claims priority under 35 U.S.C. § 119(a) to Patent Application No. JP 2012-014991 filed on Jan. 27, 2012, all of which are hereby expressly incorporated by reference into the present application.

TECHNICAL FIELD OF THE INVENTION

The present invention relates to a pipeline which has a plurality of weld zones in which ends of a plurality of steel pipes are joined by welding, and a manufacturing method thereof.

RELATED ART

When a pipeline is laid on the seabed, conventionally, a method of girth-welding steel pipes one by one on a vessel in a laying area, and sequentially sending the welded pipe to form a pipeline has been mainly used. However, in recent years, as a method of laying a pipeline, a spool method of forming a long pipe by girth-welding steel pipes in advance on land or on a vessel berthed at a steel pipe supply base, then, coiling the long pipe around a drum, transporting the pipe to the ocean where the pipeline is to be laid, and uncoiling the pipe on the ocean while laying a pipeline has been increasingly employed.

When the steel pipe is coiled on the drum, compressive strain occurs inside the coiling in a longitudinal direction of the steel pipe. In addition, outside the coiling, tensile strain occurs in a longitudinal direction of the steel pipe. The strain becomes the maximum compressive strain at an inner arc edge which is the innermost position of the coiling and becomes the maximum tensile strain at an outer arc edge which is the outermost position of the coiling. The magnitude of the strain is proportional to the diameter of the steel pipe and inversely proportional to the diameter of the drum. In a generally used steel pipe outside-diameter (for example, an outer diameter of 193.7 mm to 457.2 mm) and drum diameter (for example, a diameter of 16 m), a plastic strain of about 2% to 4% occurs at coiling in the inner arc edge and the outer arc edge. On the other hand, even when the steel pipe coiled around the drum is uncoiled on a vessel and is stretched linearly, similarly, a plastic strain of about 2% to 4% occurs in the steel pipe. In consideration of additional bending and unbending in the laying work, or bending in grounding on the seabed, it is necessary that the steel pipe and the girth-welded zone withstand three cycles of bending and unbending.

When the steel pipe is coiled around the drum, or when the steel pipe is uncoiled, the steel pipe and the vicinity of the girth-weld zone is excessively constricted or buckling occurs at the inner arc edge of the pipe body in the vicinity of the girth-weld zone in some cases. As a method of improving the bendability of the steel pipe, for example, in Patent Documents 1 and 2, there is disclosed a method of preventing softening of a heat affected zone of girth welding. In addition, for example, in Patent Documents 3, there is disclosed a method of decreasing the yield ratio of a steel pipe. Further, for example, in Patent Document 4, there is disclosed a method of limiting shape irregularity in a girth-weld zone.

PRIOR ART DOCUMENT

Patent Document

[Patent Document 1] Japanese Unexamined Patent Application, First Publication No. H3-133576
[Patent Document 2] Japanese Unexamined Patent Application, First Publication No. H3-211255
[Patent Document 3] Japanese Unexamined Patent Application, First Publication No. 2001-192773
[Patent Document 4] Japanese Unexamined Patent Application, First Publication No. 2006-281217

DISCLOSURE OF THE INVENTION

Problems to be Solved by the Invention

When the steel pipe is coiled around the drum and uncoiled from the drum, in order to improve the bending buckling resistance of the steel pipe so as not to cause buckling, the improvement of the work hardening properties of the steel pipe itself is effective. Then, in order to improve the work hardening properties of the steel pipe itself, decrease in the yield ratio (a ratio of yield strength to tensile strength) of the steel pipe is effective. However, the bending buckling resistance of the girth-weld zone is inferior to that of the steel pipe. Therefore, even when the work hardening properties of the steel pipe itself are improved, it is difficult to avoid buckling occurring at the inner arc edge of the pipe body of the steel pipe in the vicinity of the girth-weld zone. That is, even when the shape irregularity of the girth-weld zone is suppressed and further, the steel pipe having a low yield ratio is used, buckling occurs in the vicinity of the girth-weld zone.

The present invention has been made in consideration of the above problems. That is, an object of the present invention is to provide a pipeline in which deformation properties of a steel pipe (line pipe) is sufficiently exhibited. Here, the pipeline is formed by joining a plurality of steel pipes (line pipes).

Means for Solving the Problem

Even when the buckling resistance of the steel pipe itself is improved, buckling may occur in the vicinity of a weld zone of a welded joint zone where the steel pipes are joined with each other. It has been found that the buckling occurs not only in a zone affected by heat from welding, but also in a base metal portion which is not affected by heat in the welded joint zone.

Generally, the pipeline is laid over several kilometers or longer in many cases. The amount producible per melting charge is about 300 tons at most and thus, a steel pipe produced from plural pieces of molten steel is usually included in the pipeline. Even when the steel is melted so as to have the same chemical components, the ratio of each alloy element is changed within a target range. That is, there is a change between melting charges of the chemical components. In addition, even when the steel pipe is produced from the same molten steel, rolling conditions among the plural steel pipes are almost never completely identical. Therefore, even when the standard of each steel pipe used in the pipeline corresponds to the same standard, usually, there is a strength difference between the steel pipes in a predetermined range.

The inventors have paid attention to not only the yield ratio which represents the work hardening properties of a material, but also the strength difference between steel pipes that face each other in a girth-weld zone, and have conducted an intensive investigation into an influence on a buckling limitation of the steel pipe (a distance between a spool surface and an inner arc edge of the steel pipe at the time when wrinkles, that is, buckling is caused by greatly deforming the vicinity of the girth-weld zone of the inner arc edge). As a result, in a case where the difference in yield strength between the steel pipes is large, buckling occurs early even when, for example, the steel pipe has a low yield ratio. It has been newly found that in a case where the yield strength difference is small, buckling hardly occurs even when the steel pipe has a high yield ratio. That is, in order to obtain a pipeline in which the occurrence of buckling is suppressed over the entire length thereof, it is not sufficient only to control the production conditions of the steel pipe and it is necessary to carefully select steel pipes that face each other and weld the selected pipes in the production of the pipeline (in girth welding). In addition, since the pipeline is laid over a distance of several kilometers or longer as described above, it cannot be considered that steel pipes having a small yield strength difference over the entire length are welded unless steel pipes that face each other are intentionally selected and welded.

The present invention is made based on the above findings and the gist thereof is as follows.

(1) According to an aspect of the present invention, there is provided a pipeline which has a plurality of weld zones in which ends of a plurality of steel pipes are joined by welding, wherein: the plurality of the steel pipes are produced from a plurality of charges of molten steel having one or more steel compositions; a yield point elongation is not present on a stress-strain curve that is obtained when stress is applied in a longitudinal direction of each of the steel pipes; t which is a thickness of each of the steel pipes in units of mm and D which is an average pipe outside-diameter in units of mm satisfy a following Expression (a); and in the plurality of the weld zones, ΔYS which is a yield strength difference between one steel pipe and the other steel pipe that are welded to each other in units of MPa, and YR which represents a yield ratio that is a ratio of the yield strength to a tensile strength of a pipe having a low yield strength out of the one steel pipe and the other steel pipe, satisfy a following Expression (b).

$$t/D \times 100 \leq 6 \tag{a}$$

$$\Delta YS \leq -1.75 \times YR + 230 \tag{b}$$

(2) The pipeline according to (1) may further contain, as the steel compositions, by mass %, C: 0.04% or more and 0.15% or less, Mn: 1.0% or more and 1.75% or less, Nb: 0.005% or more and 0.10% or less, Ti: 0.005% or more and 0.02% or less, Al: 0.001% or more and 0.06% or less, Si: limited to 0.4% or less, P: limited to 0.015% or less, S: limited to 0.005% or less, N: limited to 0.007% or less, and a balance consisting of Fe and unavoidable impurities, a ΔCeq value which is an absolute value of a difference of Ceq values expressed by a following Expression (c) may be 0.045% or less between the one steel pipe and the other steel pipe, and the tensile strength of the plurality of the steel pipes may be 450 MPa to 850 MPa.

$$Ceq=[C]+[Mn]/6 \tag{c}$$

Here, [C], and [Mn] represent C and Mn contents by mass %.

(3) The pipeline according to (2) may further contain, as the steel compositions, by mass %, one or more of Cu: 0.1% or more and 1.0% or less, Ni: 0.1% or more and 1.0% or less, Cr: 0.1% or more and 1.0% or less, Mo: 0.05% or more and 0.3% or less, and V: 0.01% or more and 0.1% or less, and the ΔCeq value may be expressed by Expression (d).

$$Ceq=[C]+[Mn]/6+([Ni]+[Cu])/15+([Cr]+[Mo]+[V])/5 \tag{d}$$

Here, [C], [Mn], [Ni], [Cu], [Cr], [Mo], and [V] represent amounts of C, Mn, Ni, Cu, Cr, Mo, and V by mass %.

(4) According to another aspect of the present invention, there is provided a pipeline which has a plurality of weld zones in which ends of a plurality of steel pipes are joined by welding, wherein: the plurality of the steel pipes are produced from a plurality of charges of molten steel having one or more steel composition; a yield point elongation is present on a stress-strain curve that is obtained when stress is applied in a longitudinal direction of each of the steel pipes; t which is a thickness of each of the steel pipes in units of mm and D which is an average pipe outside-diameter in units of mm satisfy a following Expression (e); and in the plurality of the weld zones, ΔYS which is a yield strength difference between one steel pipe and the other steel pipe that are welded to each other in units of MPa, and YR which represents a yield ratio that is a ratio of the yield strength to tensile strength of one out of the one steel pipe and the other steel pipe having a low yield strength satisfy a following Expression (f).

$$t/D \times 100 \leq 6 \tag{e}$$

$$\Delta YS \leq -0.69 \times YR + 125 \tag{f}$$

(5) The pipeline according to (4) may contain, as the steel compositions, by mass %, C: 0.04% or more and 0.15% or less, Mn: 1.0% or more and 1.75% or less, Nb: 0.005% or more and 0.05% or less, Ti: 0.005% or more and 0.02% or less, Al: 0.001% or more and 0.06% or less, Si: limited to 0.4% or less, P: limited to 0.015% or less, S: limited to 0.005% or less, N: limited to 0.007% or less, and a balance consisting of Fe and unavoidable impurities, a Ceq value which is an absolute value of a difference of Ceq values expressed by a following Expression (g) may be 0.045% or less between the one steel pipe and the other steel pipe, the tensile strength of the plurality of the steel pipes may be 450 MPa to 850 MPa, and front and rear surfaces of the plurality of the steel pipes may be coated with thermosetting resin.

$$Ceq=[C]+[Mn]/6 \tag{g}$$

Here, [C], and [Mn] represent amounts of C and Mn by mass %.

(6) The pipeline according to (5) may further contain, as the steel compositions, by mass %, one or more of Cu: 0.1% or more and 1.0% or less, Ni: 0.1% or more and 1.0% or less, Cr: 0.1% or more and 1.0% or less, Mo: 0.05% or more and 0.3% or less, and V: 0.01% or more and 0.1% or less, and the iCeq value may be expressed by Expression (h).

$$Ceq=[C]+[Mn]/6+([Ni]+[Cu])/15+([Cr]+[Mo]+[V])/5 \tag{h}$$

Here, [C], [Mn], [Ni], [Cu], [Cr], [Mo], and [V] represent amounts of C, Mn, Ni, Cu, Cr, Mo, and V by mass %.

(7) The pipeline according to (4) may contain, as the steel compositions, by mass %, C: 0.04% or more and 0.15% or less, Mn: 1.0% or more and 1.75% or less, Nb: 0.005% or more and 0.05% or less, Ti: 0.005% or more and 0.02% or less, Al: 0.001% or more and 0.06% or less, Si: limited to 0.4% or less, P: limited to 0.015% or less, S: limited to 0.005% or less, N: limited to 0.007% or less, and a remainder consisting of Fe and unavoidable impurities, a ΔCeq value which is an absolute value of a difference of Ceq values expressed by a following Expression (i) may be 0.045% or less between the one steel pipe and the other steel pipe, and the tensile strength of the plurality of the steel pipes may be 450 MPa or more and 850 MPa or less.

$$Ceq=[C]+[Mn]/6 \qquad (i)$$

Here, [C], and [Mn] represent amounts of C and Mn contents by mass %.

(8) The pipeline according to (7) may further contain, as the steel compositions, by mass %, at least one of Cu: 0.1% or more and 1.0% or less, Ni: 0.1% or more and 1.0% or less, Cr: 0.1% or more and 1.0% or less, Mo: 0.05% or more and 0.3% or less, and V: 0.01% or more and 0.1% or less, and the Ceq value may be expressed by Expression (j).

$$Ceq=[C]+[Mn]/6+([Ni]+[Cu])/15+([Cr]+[Mo]+[V])/5 \qquad (j)$$

Here, [C], [Mn], [Ni], [Cu], [Cr], [Mo], and [V] represent amounts of C, Mn, Ni, Cu, Cr, Mo, and V by mass %.

(9) According to still another aspect of the present invention, there is provided a method of producing the pipeline according to (1) including: a first yield strength measuring process in which the yield strength of the plurality of the steel pipes is measured; and a first welding process in which steel pipes in which the LYS satisfies the above Expression (b) are welded.

(10) According to still another aspect of the present invention, there is provided a method of producing the pipeline according to (1) including: a first assigning process in which production numbers capable of specifying each of the steel pipes are assigned to the plurality of the steel pipes in order of rolling; and a second welding process in which steel pipes produced from the same molten steel and the same hot-rolled coil and having a difference between the production numbers of 1 or more and 5 or less are weld.

(11) According to still another aspect of the present invention, there is provided a method of producing the pipeline according to (4) including: a second yield strength measuring process in which the yield strength of the plurality of the steel pipes is measured; and a third welding process in which steel pipes in which the ΔYS satisfies the above Expression (f) are welded.

(12) According to still another aspect of the present invention, there is provided a method of producing the pipeline according to (4) including: a second assigning process in which production numbers capable of specifying each of the steel pipes are assigned to the plurality of the steel pipes in order of rolling; and a forth welding process in which steel pipes produced from the same molten steel and the same hot-rolled coil and having a difference between the production numbers of 1 or more and 5 or less are welded.

EFFECTS OF THE INVENTION

According to the present invention, it is possible to provide the pipeline in which the deformation properties of the steel pipe can be sufficiently exhibited and thus, the present invention very remarkably contributes to the industry.

EMBODIMENTS OF THE INVENTION

Figure 1:
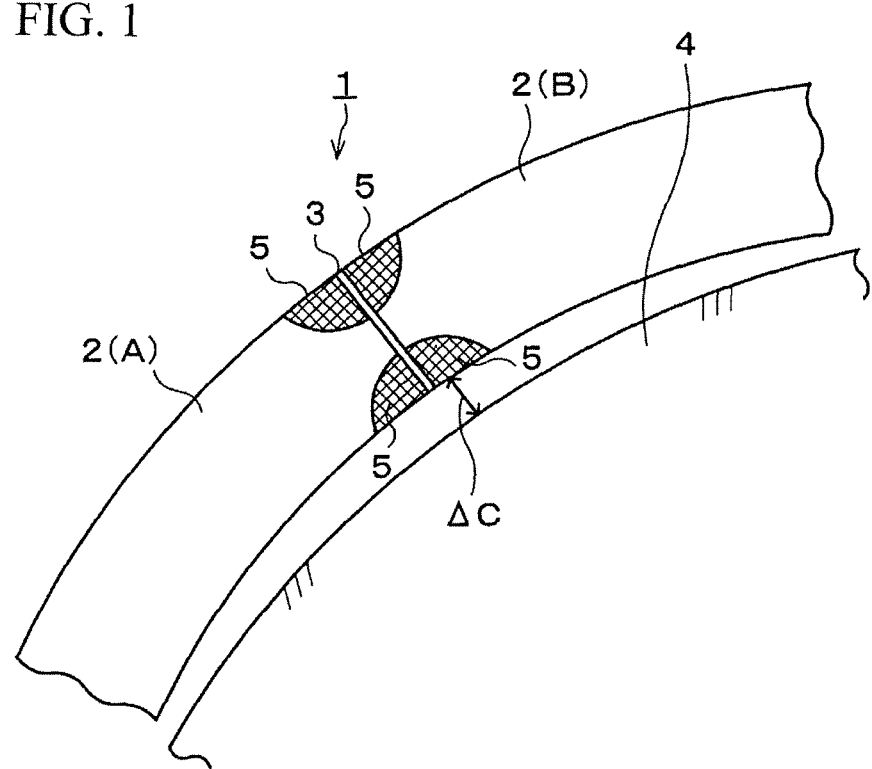
FIG. 1 is a view showing a state in which a steel pipe floats on an outer surface of a drum and illustrating a gap ΔC and strain occurring at an inner arc edge of the steel pipe.

Hereinafter, a pipeline according to an embodiment of the present invention (hereinafter, referred to as a pipeline according to an embodiment in some cases) will be described with reference to the drawings. As shown in FIG. 1, a pipeline 1 has a joint structure in which the ends of plural steel pipes 2 are joined by welding. In the joint structure in which the ends of the steel pipes are welded to each other, one steel pipe 2 is set to a steel pipe A and the other steel pipe 2 is set to a steel pipe B for the sake of description. The ends of the steel pipe A and the steel pipe B are abutted against each other and joined at a weld zone 3 by full-circled welding. The length of the pipeline according to the embodiment is increased by joining a plurality of steel pipes in the above-described manner.

When the pipeline 1 according to the embodiment is laid on the seabed in a spool method, as show in FIG. 1, the pipeline 1 is coiled around a drum 4, transported to the ocean where the pipeline is to be laid, and uncoiled at the site to lay the pipeline 1 on the seabed. When the steel pipe is coiled around the drum 4, at an inner arc edge that is the innermost position of the coiling, the maximum compressive strain occurs in a longitudinal direction of the pipeline 1 (steel pipe 2). In addition, at an outer arc edge that is the outermost position of the coiling, the maximum tensile strain occurs in the longitudinal direction of the pipeline 1 (steel pipe 2). In particular, buckling may occur at the inner arc edge in a base metal portion of the welded joint zone, particularly, in the vicinity of a heat affected zone (HAZ) 5 of a weld zone 3.

When the length of the pipeline 1 is increased, the pipeline 1 is coiled around the drum 4 many times. However, since the largest strain occurs in the pipeline coiled on the innermost side, in the embodiment, the behavior of the pipeline coiled on the innermost side will be described.

First, the inventors have attempted a numerical analysis simulation by finite element analysis (FEA) to clarify a buckling mechanism when the pipeline 1 (steel pipe 2) is coiled around the drum 4 as shown in FIG. 1. In the analysis, the yield ratio YR of the steel pipe A and the steel pipe B were set to 85%, 92.5%, 95%, or 98%. In addition, the difference ΔYS between the yield strength of the steel pipe A and the yield strength of the steel pipe B was set to 0 MPa, 50 MPa, 75 MPa, or 100 MPa. Then, each yield ratio YR and each yield strength difference ΔYS were combined to perform analysis.

When the pipeline 1 (steel pipe 2) is coiled around the drum 4 as shown in FIG. 1, the compressive strain occurring in the heat affected zone inside of the coiling and the tensile strain occurring in the heat affected zone outside of the coiling may cause the pipeline 1 (steel pipe 2) to float on the outer surface of the drum 4 in the weld zone 3 in some cases. In this case, a gap ΔC is generated between the inner arc edge (inner surface) of the pipeline 1 (steel pipe 2) and the outer surface of the drum 4. The inventors have paid attention to the gap ΔC to investigate buckling that occurs at the inner arc edge.

Figure 2:
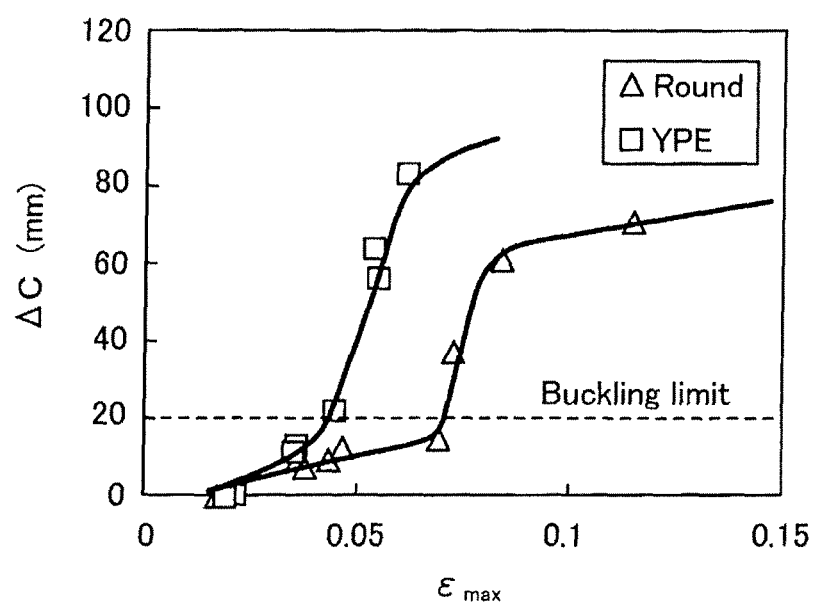
FIG. 2 is a view showing a relationship between the gap ΔC and the maximum strain occurring at the inner arc edge of the steel pipe.

The inventors have observed a relationship between the gap ΔC and the maximum strain ϵmax occurring at the inner arc edge when the thickness t (mm) and the average pipe outside-diameter D (mm) of the steel pipe are within the range of t/D×100≤6. As a result, as shown in FIG. 2, regardless of the magnitude (combination) of the yield ratio YR and the yield strength difference ΔYS, when the gap ΔC exceeds 20 mm, the value of the gap ΔC rapidly increases. That is, it has been found that local buckling occurs. The limit value of the gap ΔC, in which buckling occurs, was about 20 mm in both a steel pipe (a so-called "round type" steel pipe) in which yield point elongation does not appear on a stress-strain curve (SS curve) obtained when stress is applied in the longitudinal direction and a steel pipe (a so-called "YPE type" steel pipe) in which yield point elongation appears on a stress-strain curve obtained when stress is applied in the longitudinal direction. On the other hand, it has been clear that a larger local buckling strain occurs in the round type steel pipe than in the YPE type steel pipe, and the round type steel pipe is hardly buckled.

Figure 3:
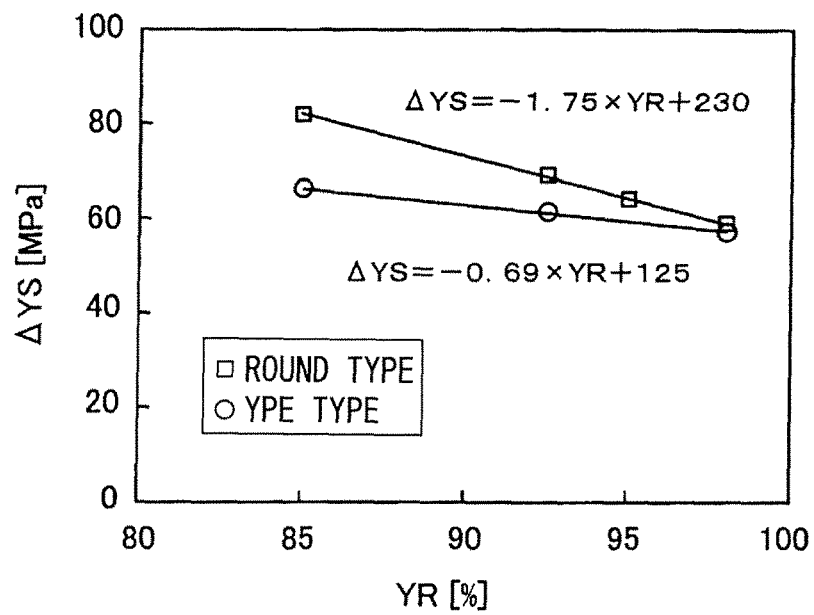
FIG. 3 is a view showing a relationship between a yield strength difference ΔYS and a yield ratio YR of steel pipes to be girth-welded.

Next, the inventors have investigated a relationship between the yield strength difference ΔYS and the yield ratio YR when the gap ΔC reaches 20 mm. As a result, as shown in FIG. 3, it has been found that the yield strength difference ΔYS and the yield ratio YR have a proportional relationship. In addition, FIG. 3 shows a relationship between the yield ratio YR and the yield strength difference ΔYS of one (A or B) of the steel pipe A and the steel pipe B having a low yield strength. As seen from FIG. 3, it has been clear that the relationship between the yield ratio YR and the yield strength difference ΔYS in the round type steel pipe is different from the relationship between the yield ratio YR and the yield strength difference ΔYS in the YPE type steel pipe. That is, the graph in FIG. 3 shows that local buckling can be prevented from occurring by controlling the relationship between the yield strength difference ΔYS between the steel pipe A and the steel pipe B and the yield ratio YR of a steel pipe (A or B) having a low yield strength in a pipeline formed of steel pipes (round type steel pipes) having a round type SS curve so as to satisfy the following Expression (b).

$$\Delta YS \leq -1.75 \times YR + 230 \quad (b)$$

On the other hand, it is found that local buckling can be prevented from occurring in a pipeline formed of steel pipes having a YPE type SS curve by controlling the relationship between the yield strength difference ΔYS between the steel pipe A and the steel pipe B and the yield ratio YR of a steel pipe (A or B) having a low yield strength so as to satisfy the following Expression (f).

$$\Delta YS \leq -0.69 \times YR + 125 \quad (f)$$

For the purpose of improving corrosion resistance or the like, even when a steel pipe using a steel sheet whose front and rear surface are coated with a thermosetting resin is used, the relationship of the above Expression (f) is satisfied.

In the pipeline according to the embodiment, local buckling can be prevented from occurring over the entire length regardless of the components or the strength of the steel pipe such that steel pipes that face each other satisfy the above relationship (when the steel pipe is a round type, Expression (b) is satisfied, and when the steel pipe is a YPE type, Expression (f) is satisfied).

However, when properties suitable for practical use (for example, properties which satisfy X42 to X80 defined by American Petroleum Institute (API) SPECIFICATION 5L) are obtained, it is preferable to control each steel pipe as follows.

In the steel pipe (hereinafter, referred to as the steel pipe according to the embodiment in some cases) used in the pipeline according to the embodiment, a preferable chemical component range will be described. Here, in the pipeline, a plurality of charges of molten steel is used, but it is preferable that all the molten steel be within the following range. "%" in the content of each element means "mass %".

C: 0.04% or more and 0.15% or less

C is an element which contributes to the strengthening of the steel (steel pipe) and the content is preferably 0.04% or more. On the other hand, when C is excessively contained, toughness and weldability are deteriorated, and thus, the upper limit is preferably 0.15%. A more preferable range is 0.05% or more and 0.10% or less.

Mn: 1.0% or more and 1.75% less

Mn is an element which increases hardenability and contributes to the strengthening of the steel, and the content is preferably 1.0% or more. On the other hand, Mn is an element which is easily segregated and when Mn is excessively contained, coarse MnS is formed at the center portion of the sheet thickness and thus, the properties may be deteriorated. Therefore, the upper limit of the Mn content is preferably 1.75%. A more preferable range is 1.0% or more and 1.6% or less.

Nb: 0.005% or more and 0.10% or less

Nb is an element which facilitates refinement as a hot-rolled state by suppressing recrystallization during hot rolling (in a state in which subsequent processes such as heat treatment are not performed after hot rolling). In addition, Nb is an element which forms carbonitrides and contributes to the refinement and strengthening of the structure. In order to obtain the effects, the Nb content is preferably 0.005% or more. On the other hand, when Nb is excessively contained, carbonitrides are coarsened and the properties may be deteriorated. Therefore, the Nb content is preferably 0.10% or less. The content is more preferably 0.06% or less.

Ti: 0.005% or more and 0.02% or less

Ti is an element which forms nitrides, fixes N and contributes to the refinement and strengthening of the structure. In order to obtain the effects, the Ti content is preferably 0.005% or more. On the other hand, when Ti is excessively added, coarse TiN is formed and the properties may be deteriorated. Therefore, the upper limit of the Ti content is preferably 0.02%.

Al: 0.001% or more and 0.06% or less

Al is an effective element as a deoxidizing agent. In order to obtain a deoxidation effect, the Al content is preferably 0.001% or more. On the other hand, even when 0.06% or more of Al is added, the above effect is saturated and the steel is rather embrittled. Therefore, when Al is contained, the Al content is preferably 0.001% or more and 0.06% or less. The lower limit of the Al content is more preferably 0.01% or more.

Si: 0.4% or less

Si is an element which is used for deoxidation and the strengthening of the steel. However, when Si is excessively contained, an embrittlement phase is formed in the welding heat affected zone in some cases. Therefore, it is preferable that the Si content be limited to 0.4% or less. The Si content may be 0%.

P: 0.015% or less

P is an impurity and is segregated at the grain boundary to deteriorate the properties. Thus, the P content is preferably limited to 0.015% or less. The P content may be 0%.

S: 0.005% or less

S is an impurity and forms sulfides such as MnS or the like to deteriorate the properties. Therefore, it is preferable that the S content be limited to 0.005% or less. The S content may be 0%.

N: 0.007% or less

N is an element which forms nitrides such as TiN or the like and fine TiN is used for the refinement of the structure. However, when N is excessively contained, coarse nitrides are formed and the properties are deteriorated. Therefore, it is preferable that the N content be limited to 0.007% or less. The N content may be 0%.

In the steel pipe according to the embodiment, further, Cu, Ni, Cr, Mo, and V which contribute to strengthening may be contained within the following ranges as necessary. Since these chemical elements are not necessarily added in the steel sheet, all the lower limits of the chemical elements are limited to 0% and thus, are not limited.

Cu: 0.1% or more and 1.0% or less

Cu is an element which increases the hardenability of the steel to increase the strength of the steel. In order to obtain the effect, it is preferable that the Cu content be 0.1% or more. However, when the Cu content exceeds 1.0%, weldability is reduced or cracking occurs on the surface of the steel during rolling in some cases. Accordingly, the Cu content is limited to 1.0% or less. The Cu content is more preferably 0.95% or less, and even more preferably 0.5% or less, and 0.2% or less.

Ni: 0.1% or more and 1.0% or less

Ni is an element which increases the hardenability of the steel to increase the strength of the steel, and contributes to the improvement of low temperature toughness. In order to obtain the effects, it is preferable that the Ni content is 0.1% or more. However, when the Ni content exceeds 1.0%, there is a concern that weldability may be reduced. Therefore, the Ni content is limited to 1.0% or less. The Ni content is more preferably 0.5% or less, and more preferably 0.3% or less.

Cr: 0.1% or more and 1.0% or less

Cr is an element which increases the hardenability of the steel to increase the strength of the steel. In order to obtain the effect, it is preferable that the Cr content is 0.1% or more. However, when the Cr content exceeds 1.0%, there is a concern that weldability may be deteriorated. Accordingly, the additional amount is limited to 1.0% or less. The Cr content is more preferably 0.5% or less.

Mo: 0.05% or more and 0.3% or less

Mo is an element which increases the hardenability of the steel to increase the strength of the steel, and contributes to the improvement of low temperature toughness. In order to obtain the effects, it is preferable that Mo is contained 0.05% or more. However, when the Mo content exceeds 0.3%, a large number of low temperature transformation phases are formed or precipitation hardening is excessively caused to deteriorate low temperature toughness. Therefore, the upper limit of the Mo content is limited to 0.3%. The upper limit of the Mo content is more preferably 0.2%.

V: 0.01% or more and 0.1% or less

V is an element which has the same effect as Nb but the effect is smaller than the effect of Nb. In order to obtain the effect, it is preferable that the V content be 0.01% or more. Even when the V content exceeds 0.1%, the effect is saturated and also, costs increase, and thus, the upper limit is limited to 0.1%.

In the steel pipe according to the embodiment, further, if one or two kinds or more of Ca, Mg, REM, and the like contributing to inclusion form control are selectively contained, the effect is not impaired. Further, elements other than the above elements (for example, Zr, Sn, Co, As, and the like) may be contained as a raw material to be used including additive alloy or unavoidable impurities which are eluted from a refractory lining or the like in melting within a range as long as the properties are not deteriorated. When the amounts of Cu, Ni, Cr, Mo, and V are less than the above lower limits, the elements are treated as unavoidable impurities.

The steel pipe used in the pipeline as described above is generally produced from plural pieces of molten steel. Therefore, one steel pipe and the other steel pipe which are welded to each other are produced from different molten steel in many cases. The yield strength is significantly affected by chemical components, particularly, Ceq expressed by the following Expression. Therefore, when ΔYS as the yield strength difference is decreased, decrease in a ΔCeq value which is an absolute value of the difference between Ceq values in the one steel pipe and the other steel pipe is effective. If the ΔCeq value is decreased, ΔTS is decreased. When the above-described Expression (b) or (f) is satisfied, ΔCeq is preferably 0.045 or less. ΔCeq is more preferably 0.035 or less. In addition, the one steel pipe and the other steel pipe may be produced from the same molten steel, and in this case, ΔCeq is 0.

$$Ceq=[C]+[Mn]/6+([Ni]+[Cu])/15+([Cr]+[Mo]+[V])/5 \qquad (d)$$

Here, [C], [Mn], [Ni], [Cu], [Cr], [Mo], and [V] represent the amounts, in mass %, of C, Mn, Ni, Cu, Cr, Mo, and V.

When Ni, Cu, Cr, Mo, and V are not contained, members respectively representing the element contents are 0. In this case, Expression (d) can be substituted by the following Expression (e).

$$Ceq=[C]+[Mn]/6 \qquad (e)$$

Next, a method of producing a pipeline according to an embodiment of the present invention will be described.

Figure 5A:
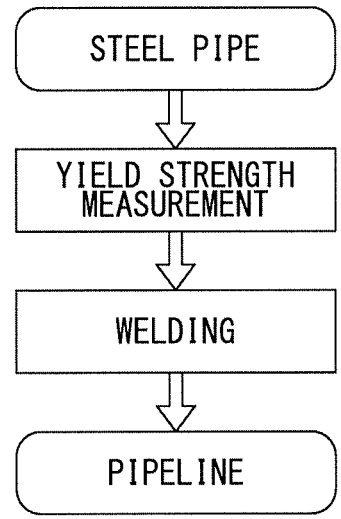
FIG. 5A is a view showing an example of a method of producing the pipeline according to the embodiment.

For example, as shown in FIG. 5A, before all of plural steel pipes used in the pipeline are joined to each other by welding, the yield strength of each steel pipe is measured. Then, one steel pipe and the other steel pipe to be welded may be selected and welded such that the above-mentioned Expression (b) is satisfied in the steel pipe showing a round type SS curve and the above-mentioned Expression (f) is satisfied in the steel pipe showing a YPE type SS curve based on the yield strength measurement result. According to the method, regardless of the components of the steel pipe and the history of production conditions, steel pipes in which ΔYS as the yield strength difference is small can be reliably welded to each other. It is possible to produce the pipeline in which the deformation properties of the steel pipes are sufficiently exhibited by welding the steel pipes selected in the above manner over the entire length.

The measurement of yield strength may be performed, for example, according to a total thickness tensile testing method defined by API Specification 5L.

Figure 5B:
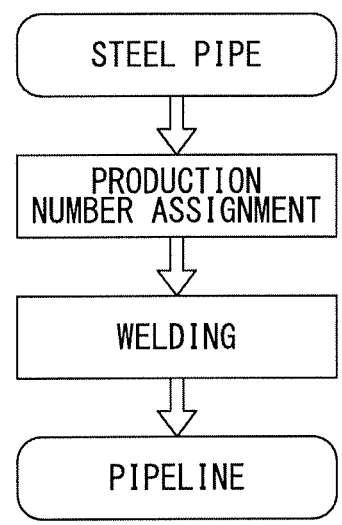
FIG. 5B is a view showing another example of the method of producing the pipeline according to the embodiment.

In addition, when the tensile strength of all steel pipes is not easily measured, as shown in FIG. 5B, production numbers that can specify the respective steel pipes are assigned to all steel pipes used in the pipeline in order of rolling (for example, X+1, X+2, . . . , X+N, and the like in order of rolling). Then, the steel pipes produced from the same molten steel and the same hot-rolled coil and having a difference between the production numbers of 1 or more and 5 or less may be welded.

When the steel pipes are not produced from the same molten steel and the same hot-rolled coil, a large yield strength difference between each steel pipe may be generated by variation in components and production conditions such as rolling conditions and the like. In addition, when the steel pipes are produced from the same molten steel and the same hot-rolled coil, the steel pipes having a large difference between the assigned production numbers have different cooling conditions when the steel pipes are coiled around a coil and thus, a large yield strength difference between the steel pipes is generated in some cases. Therefore, it is preferable that the steel pipes produced from the same molten steel and the same hot-rolled coil and having a difference between the production numbers of 1 or more and 5 or less be welded to each other. In FIG. 5B, for convenience, the production numbers are assigned after the steel pipes are formed. However, the production members may be assigned at any stage such as rolling, cooling, or preparation of a rolling plan of a steel sheet which is the material used to form the steel pipe, as long as the rolled order is clear.

When the steel pipes to be welded to each other are determined using the above-described method, the method of producing a steel pipe used in the pipeline according to the embodiment is not particularly limited and the pipeline may be produced by a conventional method depending on property desired. However, when a steel pipe having properties suitable for practical use (for example, properties which satisfy X42 to X80 defined by API Specification 5L) is obtained as for the steel pipe used in the pipeline, round type and YPE type steel pipes can be easily produced by, for example, adopting the following production method.

Examples of a pipe-making method and a production method depending on a SS curve type will be described.

(i) Electric resistance welded steel pipe (ERW) having tensile strength of 450 MPa or more and 850 MPa or less and showing round type SS curve A slab having chemical components in the above-described preferable ranges is heated to 1200° C. or higher and 1300° C. or lower and the heated slab is subjected to rough rolling to form a steel. The steel is subjected to finish rolling so that the rolling end temperature becomes 800° C. or higher and 900° C. or lower. After the finish rolling is completed, the steel is cooled from a temperature range of 780° C. or higher to a temperature range of 400° C. or higher and 600° C. or lower. The cooled steel is coiled in a temperature range of 400° C. or higher and 580° C. or lower to form a hot-rolled coil. After the hot-rolled coil is cooled to room temperature, an open pipe is formed by roll forming while the hot-rolled coil is uncoiled. The seam zone of the open pipe is welded by electric sewing welding and the electric resistance weld zone is subjected to seam heat treatment. Thus, it is possible to form a round type electric resistance welded steel pipe.

(ii) Case of UOE Steel Pipe Having Tensile Strength of 450 MPa or More and 850 MPa or Less and Showing Round Type SS Curve A slab having chemical components in the above-described preferable ranges is heated to 1100° C. or higher and 1200° C. or lower and the heated slab is subjected to rough rolling to form a steel. The steel is subjected to finish rolling so that a rolling end temperature becomes 700° C. or higher and 850° C. or lower. After the finish rolling is completed, the steel is cooled from a temperature range of 700° C. or higher to a temperature range of 500° C. or lower. Then, the cooled steel is cooled to room temperature to form a steel sheet. A round type UOE steel pipe can be formed by making the steel sheet into a pipe using a known UOE method.

When a method such as (i) or (ii) is used, it is possible to stably produce a round type steel pipe having a tensile strength of 450 MPa or more and 850 MPa or lower. In the above-described production methods, the reason that the SS curve is a round type, is that strain caused by forming at cold rolling in a pipe-making state is present.

(iii) Case of YPE Type Electric Resistance Welded Steel Pipe Having Tensile Strength of 450 MPa or More and 850 MPa or Less A slab having a predetermined steel composition is heated to 1200° C. or higher and 1300° C. or lower and the heated slab is subjected to rough rolling to form a steel. The steel is subjected to finish rolling so that a rolling end temperature becomes 800° C. or higher and 900° C. or lower. After the finish rolling is completed, the steel is cooled from a temperature range of 780° C. or higher to a temperature range of 400° C. or higher and 600° C. or lower. The cooled steel is coiled in a temperature range of 400° C. or higher and 580° C. or lower to form a hot-rolled coil. The hot-rolled coil is subjected to ERW forming according to a conventional method to make a pipe. After the ERW forming, a YPE type electric resistance welded steel pipe can be formed by performing heat treatment such as quenching and tempering (QT), tempering (T) or aging treatment. When QT is performed, for example, after heating to 900° C. to 980° C., water cooling and then, tempering at a temperature of 500° C. to 700° C. may be performed depending on a desired property. When only tempering is performed, the tempering may be performed at a temperature of 300° C. to 700° C.

(iv) Case of YPE Type Seamless Steel Pipe Having Tensile Strength of 450 MPa or More and 850 MPa or Lower A bloom having a predetermined steel composition is heated to 1200° C. or higher and 1300° C. or lower, formed into a steel pipe by a so-called Mannesmann production method, and air-cooled. Then, quenching (Q) in which the steel pipe is heated to 900° C. or higher and 950° C. or lower and water-cooled and tempering (T) in which the steel pipe is heated to 500° C. or higher and 700° C. or lower are performed and air cooling is performed. Thus, it is possible to form a YPE type seamless steel pipe.

(v) Others

In addition, by coating a round type steel pipe produced by a method such as (i) or (ii) with thermosetting resin, a YPE type steel pipe can be formed. The coating with thermosetting resin can be performed by, for example, heating the steel pipe to a temperature range of 200° C. to 250° C. with a ring-shaped induction heater or the like and spraying thermosetting resin such as epoxy resin or the like in the temperature range with a spray or the like.

Further, by heating a round type steel pipe produced by a method such as (i) or (ii) to a temperature range of about 200° C. to 250° C. and retaining the steel pipe in the temperature range for 10 minutes or longer to cause strain aging, a YPE type steel pipe can be formed. This is because an interstitial solid solution element such as C or N is fixed to the dislocation in the steel as time elapses.

Since the coating with the thermosetting resin and the aging are treatments for heating the steel pipe to the same temperature range, the coating and the aging treatment have nearly the same level of influence on the mechanical properties of the steel pipe.

When methods such as (iii) to (v) are used, it is possible to stably produce a YPE type steel pipe having a tensile strength of 450 MPa or more and 850 MPa or less.

In addition, the electric resistance welded steel pipe (ERW steel pipe) can be produced with high productivity at low cost. Further, the seamless steel pipe has properties in which a steel pipe having high t/D is easily produced.

EXAMPLES

Next, the present invention will be further described using Examples. The conditions in the examples are simply an example of conditions employed to confirm the feasibility and effect of the present invention, and the present invention is not limited to the example of conditions. The present invention can employ a variety of conditions without departing from the gist of the present invention as long as the objective of the present invention can be achieved.

In order to simulate a stress state when a steel pipe is coiled around or uncoiled from the drum, the buckling properties of a girth-welded steel pipe were evaluated using a testing apparatus which imparts a bending moment on the pipe end so as to be arranged along a bed having a radius of 3750 mm. The outline of a testing apparatus 10 used in Examples is shown in FIG. 4.

In the testing apparatus 10, an unbending bed 11 and a bending bed 12 are vertically disposed. The lower surface of the unbending bed 11 is a curved surface which is convex downward and the upper surface of the bending bed 12 is a curved surface which is convex upward. As shown in the drawing, out of the two steel pipes 2 (steel pipes A and B) whose ends are joined by girth welding in the weld zone 3, an end of the steel pipe A opposite to the weld zone 3 is interposed between the lower surface of the unbending bed 11 and the upper surface of the bending bed 12 to be fixed. Then, a bending load 13 is applied to an end of the steel pipe B opposite to the weld zone 3. In this case, the steel pipes A and B are curved along the upper surface of the bending bed 12 by applying the bending load 13 downwardly. Accordingly, a load of the same condition as in the case where the steel pipes are wound around the drum is applied to the steel pipes A and B. On the other hand, the steel pipes A and B are curved along the lower surface of the unbending bed 11 by applying the bending load 13 upwardly. Accordingly, the curved steel pipes A and B are stretched linearly, that is, a load of the same condition as in unbending is applied.

Figure 4:
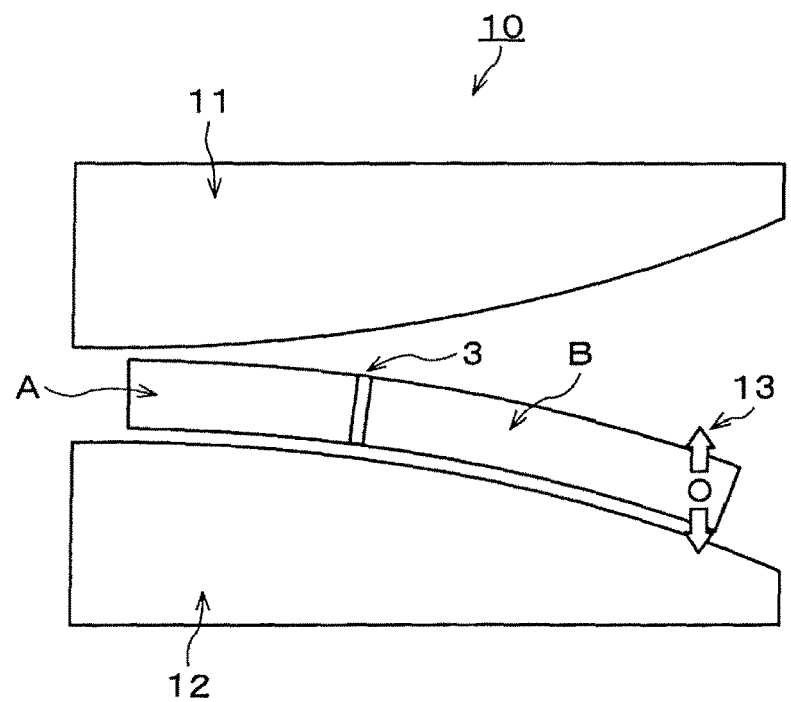
FIG. 4 is a view illustrating a testing apparatus which imparts a bending moment to the end of the steel pipe.

In order to demonstrate the index obtained from FEA, the two steel pipes A and B joined by girth-welding were subjected to a bending test using the testing apparatus 10 shown in FIG. 4. As the steel pipes A and B, as shown in Tables 2 to 28, steel sheets having steel compositions shown in Table 1 and produced under the conditions of Tables 2 to 10 were made into steel pipes having outer diameters and thicknesses shown in Tables 11 to 19, and the steel pipes which were subjected to heat treatment, aging treatment, or coating with thermosetting resin were used as necessary. The bed diameter was set as shown in Tables 20 to 28. The ΔYS of the steel pipes A and B was as shown in Tables 20 to 28.

Blank spaces in Table 1 indicate that the content was a measurement limit value or less. In the aging treatment in Table 15, the steel pipe was heated to 200° C. and retained in the temperature range for 10 minutes. In the tempering in Table 15, the steel pipe was heated to 600° C. In QT in Tables 13 and 14, quenching in which the steel pipe is water-cooled after heating to 930° C., and tempering in which the steel pipe is heated to 650° C. were performed. The coating with thermosetting resin was performed such that the steel pipe was heated to a temperature range of 200° C. to 250° C. with a ring-shaped induction heater or the like and epoxy resin was sprayed with a spray or the like in the temperature range. The tensile test of the steel sheet and the steel pipe was performed according to a total thickness tensile testing method defined by API Specification 5L.

In consideration of additional bending and unbending in the laying work, or bending in grounding on the seabed, in the testing apparatus 10 shown in FIG. 4, an operation of applying the bending load 13 downwardly to bend the steel pipes A and B, and an operation of applying the bending load 13 upwardly to unbend the steel pipes A and B were alternately repeated three cycles. As a result, when ΔYS is −1.75×YR+230 or less, in the case of the round type and when ΔYS is −0.69×YR+125 or less in the case of the YPE type, as in the test numbers 1 to 26, 46 to 65, 82 to 91, 103 to 105, 106 to 108, 111 to 115, 120, 121, 123 to 126, and 128 to 130, it was found that local buckling did not occur in bending and the joint was not fractured during three cycles of bending and unbending.

On the other hand, when ΔYS exceeds −1.75×YR+230 in the case of the round type (examples in which the type of the SS curve is round in Tables), and when ΔYS exceeds −0.69×YR+125 in the case of the YPE type (examples in which the type of the SS curve is YPE), local buckling was observed at the inner arc edge on the compressive side in the third unbending, and fracture occurred from the vicinity of the weld zone at the outer arc edge. The fractured place is a portion in which local buckling occurs at the time when the bending load is applied. It can be considered that strain is concentrated at the time of bending and unbending and the strain is accumulated to cause fracture.

Test results are suggested that the welded joint which satisfies the conditions of Expressions (b) and (f) is effective in an environment of usage in which the welded joint is subjected to coiling and uncoiling.

In addition, as seen from the test numbers 128 to 130, ΔYS satisfied Expression (b) in the steel pipe produced from the same molten steel and having the difference between the production numbers be within 5 and the joint was not fractured during three cycles of bending and unbending.

TABLE 1

| Steel Type | Component composition (mass %) | | | | | | | | | | | | | | Ceq (%) |
|---|---|---|---|---|---|---|---|---|---|---|---|---|---|---|---|
| | C | Si | Mn | P | S | Nb | Al | Ti | N | Mo | Cu | Ni | Cr | V | |
| A1 | 0.080 | 0.19 | 1.35 | 0.009 | 0.001 | 0.080 | 0.02 | 0.006 | 0.0035 | | | | | | 0.305 |
| A2 | 0.083 | 0.19 | 1.35 | 0.009 | 0.001 | 0.080 | 0.02 | 0.006 | 0.0038 | | | | | | 0.308 |
| A3 | 0.090 | 0.19 | 1.35 | 0.009 | 0.001 | 0.080 | 0.02 | 0.006 | 0.0035 | | | | | | 0.315 |
| A4 | 0.098 | 0.19 | 1.35 | 0.009 | 0.001 | 0.080 | 0.02 | 0.007 | 0.0039 | | | | | | 0.323 |
| A5 | 0.100 | 0.20 | 1.35 | 0.010 | 0.002 | 0.015 | 0.02 | 0.009 | 0.0042 | | | | | | 0.325 |
| B1 | 0.045 | 0.20 | 1.35 | 0.010 | 0.001 | 0.025 | 0.02 | 0.011 | 0.0020 | 0.06 | | | 0.19 | | 0.320 |
| B2 | 0.050 | 0.23 | 1.40 | 0.010 | 0.001 | 0.025 | 0.02 | 0.012 | 0.0030 | 0.06 | | | 0.20 | | 0.335 |
| B3 | 0.055 | 0.25 | 1.45 | 0.011 | 0.003 | 0.025 | 0.02 | 0.013 | 0.0020 | 0.07 | | | 0.18 | | 0.347 |
| C1 | 0.055 | 0.05 | 1.59 | 0.012 | 0.003 | 0.012 | 0.04 | 0.012 | 0.0045 | | 0.13 | 0.13 | 0.05 | 0.03 | 0.353 |

TABLE 1-continued

| Steel Type | Component composition (mass %) | | | | | | | | | | | | | | Ceq (%) |
|---|---|---|---|---|---|---|---|---|---|---|---|---|---|---|---|
| | C | Si | Mn | P | S | Nb | Al | Ti | N | Mo | Cu | Ni | Cr | V | |
| C2 | 0.058 | 0.06 | 1.60 | 0.011 | 0.002 | 0.008 | 0.03 | 0.010 | 0.0038 | | 0.13 | 0.14 | 0.05 | 0.03 | 0.359 |
| C3 | 0.066 | 0.09 | 1.63 | 0.009 | 0.002 | 0.009 | 0.03 | 0.013 | 0.0041 | | 0.13 | 0.16 | 0.08 | 0.04 | 0.381 |
| C4 | 0.070 | 0.10 | 1.67 | 0.013 | 0.003 | 0.013 | 0.03 | 0.011 | 0.0036 | | 0.18 | 0.18 | 0.10 | 0.03 | 0.398 |
| D1 | 0.080 | 0.25 | 1.26 | 0.015 | 0.003 | 0.040 | 0.05 | 0.013 | 0.0051 | 0.05 | | | | | 0.300 |
| D2 | 0.090 | 0.28 | 1.31 | 0.013 | 0.002 | 0.050 | 0.04 | 0.012 | 0.0049 | 0.05 | | | | | 0.318 |
| D3 | 0.100 | 0.28 | 1.31 | 0.013 | 0.003 | 0.050 | 0.04 | 0.012 | 0.0048 | 0.06 | | | | | 0.330 |
| E1 | 0.040 | 0.30 | 1.37 | 0.010 | 0.001 | 0.013 | 0.02 | 0.010 | 0.0030 | | | 0.21 | 0.41 | | 0.390 |
| E2 | 0.050 | 0.35 | 1.40 | 0.010 | 0.001 | 0.013 | 0.02 | 0.012 | 0.0060 | 0.13 | | 0.22 | 0.43 | | 0.410 |
| E3 | 0.055 | 0.36 | 1.44 | 0.011 | 0.003 | 0.015 | 0.02 | 0.013 | 0.0070 | 0.15 | | 0.25 | 0.44 | | 0.430 |

TABLE 2

| Test number | Steel pipe A or B | Steel type | Hot rolling condition | | | | | Steel sheet | | |
|---|---|---|---|---|---|---|---|---|---|---|
| | | | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 1 | A | A1 | 1230 | 80 | 860 | 820 | 490 | 379 | 527 | 72 |
| | B | A4 | 1230 | 80 | 860 | 820 | 560 | 401 | 531 | 76 |
| 2 | A | A1 | 1230 | 80 | 860 | 820 | 530 | 343 | 504 | 68 |
| | B | A4 | 1230 | 80 | 860 | 820 | 810 | 510 | 406 | 572 | 71 |
| 3 | A | A4 | 1230 | 80 | 860 | 820 | 530 | 407 | 528 | 77 |
| | B | A4 | 1230 | 80 | 860 | 820 | 500 | 420 | 538 | 78 |
| 4 | A | A1 | 1230 | 80 | 860 | 820 | 530 | 354 | 479 | 74 |
| | B | A4 | 1230 | 80 | 860 | 820 | 530 | 411 | 534 | 77 |
| 5 | A | A3 | 1230 | 80 | 860 | 820 | 560 | 376 | 530 | 71 |
| | B | A1 | 1230 | 80 | 860 | 810 | 510 | 350 | 538 | 65 |
| 6 | A | A1 | 1230 | 80 | 860 | 820 | 530 | 345 | 454 | 76 |
| | B | A4 | 1230 | 80 | 860 | 820 | 570 | 394 | 512 | 77 |
| 7 | A | A1 | 1230 | 80 | 860 | 820 | 530 | 345 | 480 | 72 |
| | B | A3 | 1230 | 80 | 860 | 820 | 500 | 398 | 530 | 75 |
| 8 | A | A1 | 1230 | 80 | 860 | 810 | 510 | 355 | 495 | 72 |
| | B | A3 | 1230 | 80 | 860 | 820 | 530 | 385 | 520 | 74 |
| 9 | A | A2 | 1230 | 80 | 860 | 820 | 560 | 362 | 489 | 74 |
| | B | A4 | 1230 | 80 | 860 | 820 | 570 | 397 | 522 | 76 |
| 10 | A | A5 | 1230 | 80 | 860 | 820 | 450 | 467 | 577 | 81 |
| | B | A4 | 1230 | 80 | 860 | 800 | 420 | 476 | 580 | 82 |
| 11 | A | A2 | 1230 | 80 | 860 | 810 | 510 | 382 | 512 | 75 |
| | B | A1 | 1230 | 80 | 860 | 820 | 500 | 372 | 523 | 71 |
| 12 | A | B2 | 1230 | 80 | 860 | 820 | 500 | 412 | 532 | 77 |
| | B | B3 | 1230 | 80 | 860 | 800 | 470 | 436 | 590 | 74 |
| 13 | A | B1 | 1230 | 80 | 860 | 820 | 500 | 367 | 510 | 72 |
| | B | B2 | 1230 | 80 | 860 | 820 | 530 | 386 | 529 | 73 |
| 14 | A | B2 | 1230 | 80 | 860 | 820 | 530 | 395 | 541 | 73 |
| | B | B1 | 1230 | 80 | 860 | 810 | 550 | 340 | 485 | 70 |
| 15 | A | B1 | 1230 | 80 | 860 | 800 | 470 | 409 | 541 | 76 |
| | B | B1 | 1230 | 80 | 860 | 820 | 500 | 374 | 505 | 74 |
| 16 | A | C2 | 1230 | 80 | 860 | 810 | 550 | 375 | 510 | 74 |
| | B | C2 | 1230 | 80 | 860 | 810 | 510 | 391 | 532 | 73 |
| 17 | A | C4 | 1230 | 80 | 860 | 820 | 530 | 433 | 528 | 82 |
| | B | C2 | 1230 | 80 | 860 | 820 | 450 | 434 | 536 | 81 |
| 18 | A | C1 | 1230 | 80 | 860 | 810 | 550 | 63 | 472 | 77 |
| | B | C4 | 1230 | 80 | 860 | 800 | 470 | 446 | 525 | 85 |
| 19 | A | C1 | 1230 | 80 | 860 | 820 | 500 | 394 | 512 | 77 |
| | B | C2 | 1230 | 80 | 860 | 810 | 540 | 387 | 530 | 73 |
| 20 | A | C1 | 1230 | 80 | 860 | 810 | 550 | 353 | 512 | 69 |
| | B | C1 | 1230 | 80 | 860 | 810 | 510 | 385 | 528 | 73 |
| 21 | A | C2 | 1230 | 80 | 860 | 820 | 570 | 371 | 501 | 74 |
| | B | C2 | 1230 | 80 | 860 | 820 | 530 | 390 | 522 | 75 |
| 22 | A | C3 | 1230 | 80 | 860 | 810 | 550 | 400 | 515 | 78 |
| | B | C3 | 1230 | 80 | 860 | 810 | 540 | 398 | 526 | 76 |
| 23 | A | C3 | 1230 | 80 | 860 | 820 | 570 | 371 | 515 | 72 |
| | B | C3 | 1230 | 80 | 860 | 810 | 510 | 410 | 540 | 76 |
| 24 | A | C4 | 1230 | 80 | 860 | 810 | 510 | 433 | 535 | 81 |
| | B | C1 | 1230 | 80 | 860 | 820 | 530 | 365 | 545 | 67 |
| 25 | A | C1 | 1230 | 80 | 860 | 810 | 550 | 349 | 529 | 66 |
| | B | C1 | 1230 | 80 | 860 | 820 | 530 | 367 | 532 | 69 |
| 26 | A | C2 | 1230 | 80 | 860 | 820 | 500 | 401 | 540 | 74 |
| | B | C2 | 1230 | 80 | 860 | 810 | 480 | 413 | 525 | 79 |

TABLE 3

| Test number | Steel pipe A or B | Steel type | Hot rolling condition | | | | | Steel sheet | | |
|---|---|---|---|---|---|---|---|---|---|---|
| | | | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 27 | A | A2 | 1230 | 80 | 860 | 820 | 530 | 365 | 504 | 72 |
| | B | A4 | 1230 | 80 | 860 | 820 | 490 | 30 | 587 | 73 |
| 28 | A | A3 | 1230 | 80 | 860 | 810 | 510 | 398 | 485 | 82 |
| | B | A5 | 1230 | 80 | 860 | 800 | 420 | 474 | 600 | 79 |
| 29 | A | A2 | 1230 | 80 | 860 | 820 | 530 | 358 | 512 | 70 |
| | B | A4 | 1230 | 80 | 860 | 820 | 450 | 441 | 580 | 76 |
| 30 | A | A5 | 1230 | 80 | 860 | 820 | 570 | 437 | 540 | 81 |
| | B | A3 | 1230 | 80 | 860 | 810 | 510 | 402 | 479 | 84 |
| 31 | A | A2 | 1230 | 80 | 860 | 820 | 570 | 341 | 542 | 63 |
| | B | A5 | 1230 | 80 | 860 | 820 | 490 | 445 | 571 | 78 |
| 32 | A | A3 | 1230 | 80 | 860 | 820 | 530 | 385 | 514 | 75 |
| | B | A4 | 1230 | 80 | 860 | 800 | 470 | 430 | 600 | 72 |
| 33 | A | A2 | 1230 | 80 | 860 | 820 | 560 | 365 | 474 | 77 |
| | B | A4 | 1230 | 80 | 860 | 810 | 510 | 415 | 552 | 75 |
| 34 | A | A2 | 1230 | 80 | 860 | 810 | 510 | 389 | 474 | 82 |
| | B | A4 | 1230 | 80 | 860 | 800 | 470 | 444 | 562 | 79 |
| 35 | A | A2 | 1230 | 80 | 860 | 820 | 530 | 358 | 512 | 70 |
| | B | A5 | 1230 | 80 | 860 | 800 | 470 | 466 | 568 | 82 |
| 36 | A | A2 | 1230 | 80 | 860 | 820 | 530 | 365 | 482 | 76 |
| | B | A4 | 1230 | 80 | 860 | 820 | 500 | 426 | 554 | 77 |
| 37 | A | B1 | 1230 | 80 | 860, | 820 | 530 | 368 | 500 | 74 |
| | B | B2 | 1230 | 80 | 860 | 800 | 470 | 421 | 587 | 72 |
| 38 | A | B1 | 1230 | 80 | 860 | 820 | 530 | 364 | 505 | 72 |
| | B | B1 | 1230 | 80 | 860 | 820 | 450 | 434 | 595 | 73 |
| 39 | A | B1 | 1230 | 80 | 860 | 820 | 530 | 365 | 485 | 75 |
| | B | B3 | 1230 | 80 | 860 | 820 | 450 | 451 | 593 | 76 |
| 40 | A | C2 | 1230 | 80 | 860 | 820 | 570 | 371 | 505 | 73 |
| | B | C3 | 1230 | 80 | 860 | 800 | 470 | 425 | 582 | 73 |
| 41 | A | C1 | 1230 | 80 | 860 | 810 | 540 | 369 | 498 | 74 |
| | B | C3 | 1230 | 80 | 860 | 820 | 450 | 450 | 570 | 79 |
| 42 | A | C2 | 1230 | 80 | 860 | 810 | 540 | 385 | 493 | 78 |
| | B | C1 | 1230 | 80 | 860 | 810 | 480 | 398 | 555 | 72 |
| 43 | A | C1 | 1230 | 80 | 860 | 810 | 550 | 364 | 480 | 76 |
| | B | C3 | 1230 | 80 | 860 | 810 | 540 | 400 | 538 | 74 |
| 44 | A | C2 | 1230 | 80 | 860 | 800 | 470 | 424 | 550 | 77 |
| | B | C1 | 1230 | 80 | 860 | 820 | 570 | 354 | 485 | 73 |
| 45 | A | C3 | 1230 | 80 | 860 | 820 | 570 | 395 | 502 | 79 |
| | B | C2 | 1230 | 80 | 860 | 810 | 480 | 416 | 568 | 73 |

TABLE 4

| Test number | Steel pipe A or B | Steel type | Hot rolling condition | | | | | Steel sheet | | |
|---|---|---|---|---|---|---|---|---|---|---|
| | | | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 46 | A | A4 | 1230 | 80 | 860 | 820 | 560 | 395 | 525 | 75 |
| | B | A3 | 1230 | 80 | 860 | 800 | 480 | 421 | 560 | 75 |
| 47 | A | A1 | 1230 | 80 | 860 | 810 | 510 | 365 | 500 | 73 |
| | B | A2 | 1230 | 80 | 860 | 810 | 510 | 371 | 515 | 72 |
| 48 | A | A4 | 1230 | 80 | 860 | 820 | 530 | 400 | 540 | 74 |
| | B | A4 | 1230 | 80 | 860 | 800 | 470 | 420 | 568 | 74 |
| 49 | A | A4 | 1230 | 80 | 860 | 820 | 560 | 393 | 531 | 74 |
| | B | A4 | 1230 | 80 | 860 | 810 | 510 | 410 | 547 | 75 |
| 50 | A | A4 | 1230 | 80 | 860 | 820 | 500 | 400 | 549 | 73 |
| | B | A4 | 1230 | 80 | 860 | 820 | 500 | 419 | 564 | 74 |
| 51 | A | A4 | 1230 | 80 | 860 | 820 | 560 | 411 | 542 | 76 |
| | B | A4 | 1230 | 80 | 860 | 810 | 510 | 426 | 558 | 76 |
| 52 | A | A1 | 1230 | 80 | 860 | 810 | 510 | 351 | 495 | 71 |
| | B | A4 | 1230 | 80 | 860 | 810 | 510 | 418 | 550 | 76 |
| 53 | A | A4 | 1230 | 80 | 860 | 810 | 510 | 401 | 549 | 73 |
| | B | A5 | 1230 | 80 | 860 | 800 | 420 | 452 | 603 | 75 |
| 54 | A | A4 | 1230 | 80 | 860 | 800 | 470 | 441 | 612 | 72 |
| | B | A4 | 1230 | 80 | 860 | 820 | 570 | 398 | 522 | 76 |
| 55 | A | B1 | 1230 | 80 | 860 | 820 | 500 | 367 | 500 | 73 |
| | B | B1 | 1230 | 80 | 860 | 800 | 470 | 414 | 553 | 75 |
| 56 | A | B1 | 1230 | 80 | 860 | 820 | 500 | 361 | 516 | 70 |

TABLE 4-continued

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| | B | B2 | 1230 | 80 | 860 | 820 | 530 | 369 | 520 | 71 |
| 57 | A | B1 | 1230 | 80 | 860 | 820 | 530 | 384 | 497 | 77 |
| | B | B2 | 1230 | 80 | 860 | 800 | 470 | 435 | 587 | 74 |
| 58 | A | C3 | 1230 | 80 | 860 | 810 | 510 | 408 | 545 | 75 |
| | B | C3 | 1230 | 80 | 860 | 800 | 470 | 432 | 580 | 74 |
| 59 | A | C2 | 1230 | 80 | 860 | 810 | 510 | 383 | 540 | 71 |
| | B | C1 | 1230 | 80 | 860 | 820 | 530 | 375 | 535 | 70 |
| 60 | A | C1 | 1230 | 80 | 860 | 810 | 550 | 346 | 509 | 68 |
| | B | C2 | 1230 | 80 | 860 | 800 | 470 | 416 | 555 | 75 |
| 61 | A | C2 | 1230 | 80 | 860 | 810 | 480 | 418 | 566 | 74 |
| | B | C3 | 1230 | 80 | 860 | 820 | 450 | 445 | 578 | 77 |
| 62 | A | C1 | 1230 | 80 | 860 | 810 | 510 | 388 | 524 | 74 |
| | B | C2 | 1230 | 80 | 860 | 810 | 550 | 380 | 506 | 75 |
| 63 | A | C3 | 1230 | 80 | 860 | 810 | 540 | 406 | 534 | 76 |
| | B | C3 | 1230 | 80 | 860 | 820 | 450 | 444 | 576 | 77 |
| 64 | A | C2 | 1230 | 80 | 860 | 820 | 570 | 364 | 512 | 71 |
| | B | C2 | 1230 | 80 | 860 | 810 | 480 | 416 | 578 | 72 |
| 65 | A | C3 | 1230 | 80 | 860 | 820 | 450 | 448 | 578 | 78 |
| | B | C1 | 1230 | 80 | 860 | 810 | 510 | 382 | 528 | 72 |

TABLE 5

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 66 | A | C2 | 1230 | 80 | 860 | 820 | 570 | 378 | 513 | 74 |
| | B | C3 | 1230 | 80 | 860 | 800 | 470 | 423 | 580 | 73 |
| 67 | A | C3 | 1230 | 80 | 860 | 810 | 510 | 416 | 540 | 77 |
| | B | C4 | 1230 | 80 | 860 | 800 | 470 | 458 | 603 | 76 |
| 68 | A | C3 | 1230 | 80 | 860 | 810 | 550 | 413 | 510 | 81 |
| | B | C3 | 1230 | 80 | 860 | 820 | 450 | 471 | 574 | 82 |
| 69 | A | A2 | 1230 | 80 | 860 | 820 | 530 | 365 | 499 | 73 |
| | B | A4 | 1230 | 80 | 860 | 810 | 510 | 412 | 554 | 74 |
| 70 | A | A4 | 1230 | 80 | 860 | 820 | 570 | 390 | 520 | 75 |
| | B | A5 | 1230 | 80 | 860 | 820 | 490 | 440 | 562 | 78 |
| 71 | A | A2 | 1230 | 80 | 860 | 810 | 510 | 383 | 517 | 74 |
| | B | A4 | 1230 | 80 | 860 | 820 | 450 | 434 | 586 | 74 |
| 72 | A | A4 | 1230 | 80 | 860 | 820 | 530 | 397 | 544 | 73 |
| | B | A1 | 1230 | 80 | 860 | 810 | 510 | 342 | 495 | 69 |
| 73 | A | B1 | 1230 | 80 | 860 | 820 | 530 | 350 | 500 | 70 |
| | B | B2 | 1230 | 80 | 860 | 800 | 470 | 435 | 573 | 76 |
| 74 | A | B1 | 1230 | 80 | 860 | 820 | 500 | 384 | 511 | 75 |
| | B | B3 | 1230 | 80 | 860 | 820 | 450 | 450 | 584 | 77 |
| 75 | A | B2 | 1230 | 80 | 860 | 820 | 530 | 394 | 519 | 76 |
| | B | B3 | 1230 | 80 | 860 | 820 | 450 | 465 | 591 | 79 |
| 76 | A | C3 | 1230 | 80 | 860 | 810 | 540 | 408 | 525 | 78 |
| | B | C3 | 1230 | 80 | 860 | 800 | 470 | 436 | 581 | 75 |
| 77 | A | C3 | 1230 | 80 | 860 | 820 | 570 | 399 | 505 | 79 |
| | B | C3 | 1230 | 80 | 860 | 820 | 450 | 464 | 580 | 80 |
| 78 | A | C2 | 1230 | 80 | 860 | 820 | 570 | 375 | 515 | 73 |
| | B | C2 | 1230 | 80 | 860 | 800 | 470 | 432 | 548 | 79 |
| 79 | A | C1 | 1230 | 80 | 860 | 810 | 550 | 345 | 470 | 73 |
| | B | C2 | 1230 | 80 | 860 | 810 | 480 | 417 | 560 | 74 |
| 80 | A | C2 | 1230 | 80 | 860 | 820 | 570 | 361 | 494 | 73 |
| | B | C3 | 1230 | 80 | 860 | 800 | 470 | 418 | 589 | 71 |
| 81 | A | C3 | 1230 | 80 | 860 | 810 | 540 | 399 | 532 | 75 |
| | B | C3 | 1230 | 80 | 860 | 800 | 470 | 425 | 584 | 73 |

TABLE 6

| Test number | Steel pipe A or B | Steel type | Hot rolling condition ||||| Steel sheet |||
|---|---|---|---|---|---|---|---|---|---|---|
| | | | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 82 | A | A4 | 1230 | 80 | 860 | 820 | 570 | 390 | 524 | 74 |
|    | B | A4 | 1230 | 80 | 860 | 820 | 570 | 407 | 527 | 77 |
| 83 | A | A3 | 1230 | 80 | 860 | 820 | 500 | 397 | 530 | 75 |
|    | B | A5 | 1230 | 80 | 860 | 820 | 490 | 421 | 571 | 74 |
| 84 | A | A1 | 1230 | 80 | 860 | 820 | 490 | 388 | 530 | 73 |
|    | B | A5 | 1230 | 80 | 860 | 820 | 490 | 445 | 574 | 78 |
| 85 | A | A4 | 1230 | 80 | 860 | 820 | 490 | 435 | 581 | 75 |
|    | B | A4 | 1230 | 80 | 860 | 820 | 490 | 439 | 586 | 75 |
| 86 | A | B3 | 1230 | 80 | 860 | 820 | 500 | 427 | 570 | 75 |
|    | B | B3 | 1230 | 80 | 860 | 800 | 470 | 448 | 586 | 76 |
| 87 | A | B1 | 1230 | 80 | 860 | 820 | 530 | 355 | 489 | 73 |
|    | B | B2 | 1230 | 80 | 860 | 820 | 500 | 405 | 535 | 76 |
| 88 | A | C1 | 1230 | 80 | 860 | 810 | 480 | 402 | 560 | 72 |
|    | B | C2 | 1230 | 80 | 860 | 800 | 470 | 425 | 557 | 76 |
| 89 | A | C2 | 1230 | 80 | 860 | 810 | 540 | 355 | 490 | 72 |
|    | B | C1 | 1230 | 80 | 860 | 810 | 550 | 367 | 481 | 76 |
| 90 | A | C2 | 1230 | 80 | 860 | 800 | 470 | 420 | 548 | 77 |
|    | B | C3 | 1230 | 80 | 860 | 800 | 470 | 415 | 580 | 72 |
| 91 | A | C3 | 1230 | 80 | 860 | 820 | 450 | 436 | 570 | 76 |
|    | B | C2 | 1230 | 80 | 860 | 820 | 500 | 418 | 541 | 77 |
| 92 | A | A2 | 1230 | 80 | 860 | 820 | 530 | 367 | 505 | 73 |
|    | B | A3 | 1230 | 80 | 860 | 810 | 450 | 468 | 605 | 77 |
| 93 | A | A2 | 1230 | 80 | 860 | 820 | 560 | 368 | 478 | 77 |
|    | B | A4 | 1230 | 80 | 860 | 820 | 530 | 415 | 540 | 77 |
| 94 | A | A1 | 1230 | 80 | 860 | 820 | 530 | 333 | 450 | 74 |
|    | B | A4 | 1230 | 80 | 860 | 820 | 570 | 398 | 521 | 76 |
| 95 | A | A4 | 1230 | 80 | 860 | 820 | 570 | 393 | 510 | 77 |
|    | B | A5 | 1230 | 80 | 860 | 800 | 470 | 452 | 565 | 80 |
| 96 | A | A4 | 1230 | 80 | 860 | 820 | 500 | 420 | 541 | 75 |
|    | B | A2 | 1230 | 80 | 860 | 820 | 530 | 374 | 499 | 75 |
| 97 | A | B2 | 1230 | 80 | 860 | 820 | 530 | 385 | 544 | 71 |
|    | B | B2 | 1230 | 80 | 860 | 800 | 470 | 438 | 581 | 75 |
| 98 | A | B1 | 1230 | 80 | 860 | 820 | 500 | 374 | 510 | 73 |
|    | B | B2 | 1230 | 80 | 860 | 800 | 470 | 450 | 575 | 78 |
| 99 | A | C3 | 1230 | 80 | 860 | 810 | 510 | 411 | 549 | 75 |
|    | B | C2 | 1230 | 80 | 860 | 810 | 480 | 422 | 571 | 74 |
| 100 | A | C4 | 1230 | 80 | 860 | 810 | 510 | 420 | 534 | 79 |
|     | B | C4 | 1230 | 80 | 860 | 800 | 470 | 458 | 599 | 76 |
| 101 | A | C2 | 1230 | 80 | 860 | 810 | 540 | 385 | 530 | 73 |
|     | B | C3 | 1230 | 80 | 860 | 800 | 470 | 430 | 595 | 72 |
| 102 | A | C2 | 1230 | 80 | 860 | 820 | 570 | 375 | 494 | 76 |
|     | B | C4 | 1230 | 80 | 860 | 820 | 440 | 482 | 635 | 76 |
| 103 | A | A1 | 1230 | 80 | 860 | 820 | 500 | 398 | 528 | 75 |
|     | B | A5 | 1230 | 80 | 860 | 820 | 490 | 450 | 575 | 78 |
| 104 | A | B1 | 1230 | 80 | 860 | 820 | 530 | 350 | 495 | 71 |
|     | B | B2 | 1230 | 80 | 860 | 820 | 510 | 399 | 534 | 75 |
| 105 | A | C2 | 1230 | 80 | 860 | 800 | 480 | 410 | 545 | 75 |
|     | B | C3 | 1230 | 80 | 860 | 800 | 470 | 418 | 580 | 72 |

TABLE 7

| Test number | Steel pipe A or B | Steel type | Hot rolling condition ||||| Steel sheet |||
|---|---|---|---|---|---|---|---|---|---|---|
| | | | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 106 | A | C1 | 1230 | 80 | 860 | 810 | 550 | 338 | 472 | 72 |
|     | B | C1 | 1230 | 80 | 860 | 810 | 540 | 364 | 499 | 73 |
| 107 | A | C1 | 1230 | 80 | 860 | 820 | 570 | 341 | 487 | 70 |
|     | B | C2 | 1230 | 80 | 860 | 810 | 540 | 383 | 532 | 72 |
| 108 | A | C2 | 1230 | 80 | 860 | 810 | 550 | 385 | 510 | 75 |
|     | B | C3 | 1230 | 80 | 860 | 810 | 540 | 410 | 525 | 78 |
| 109 | A | C1 | 1230 | 80 | 860 | 810 | 550 | 345 | 462 | 75 |
|     | B | C2 | 1230 | 80 | 860 | 810 | 510 | 388 | 533 | 73 |
| 110 | A | C1 | 1230 | 80 | 860 | 810 | 580 | 340 | 454 | 75 |
|     | B | C3 | 1230 | 80 | 860 | 820 | 450 | 445 | 571 | 78 |
| 111 | A | C4 | 1230 | 80 | 860 | 820 | 440 | 467 | 640 | 73 |
|     | B | C4 | 1230 | 80 | 860 | 820 | 430 | 500 | 675 | 74 |

TABLE 7-continued

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 112 | A | C4 | 1230 | 80 | 860 | 820 | 440 | 480 | 624 | 77 |
|  | B | C4 | 1230 | 80 | 860 | 820 | 440 | 471 | 628 | 75 |
| 113 | A | C4 | 1230 | 80 | 860 | 820 | 440 | 466 | 623 | 75 |
|  | B | C4 | 1230 | 80 | 860 | 820 | 430 | 509 | 668 | 76 |
| 114 | A | C4 | 1230 | 80 | 860 | 820 | 430 | 397 | 567 | 70 |
|  | B | C1 | 1230 | 80 | 860 | 810 | 480 | 402 | 566 | 71 |
| 115 | A | C4 | 1230 | 80 | 860 | 820 | 440 | 460 | 635 | 72 |
|  | B | C4 | 1230 | 80 | 860 | 800 | 470 | 475 | 610 | 78 |
| 116 | A | C3 | 1230 | 80 | 860 | 800 | 470 | 430 | 582 | 74 |
|  | B | C4 | 1230 | 80 | 860 | 820 | 440 | 485 | 649 | 75 |
| 117 | A | C4 | 1230 | 80 | 860 | 800 | 470 | 467 | 600 | 78 |
|  | B | C4 | 1230 | 80 | 860 | 820 | 430 | 500 | 657 | 76 |
| 118 | A | C4 | 1230 | 80 | 860 | 820 | 440 | 463 | 628 | 74 |
|  | B | C4 | 1230 | 80 | 860 | 820 | 420 | 518 | 700 | 74 |
| 119 | A | C4 | 1230 | 80 | 860 | 820 | 440 | 480 | 631 | 76 |
|  | B | C4 | 1230 | 80 | 860 | 820 | 420 | 547 | 715 | 77 |

TABLE 8

| | | | Hot rolling condition | |
|---|---|---|---|---|
| Test number | Steel pipe A or B | Steel type | Heating temperature [° C.] | Production method after heating |
| 120 | A | D1 | 1260 | Air cooling after hot rolling by Mannesmann production method |
|  | B | D1 | 1260 |  |
| 121 | A | D2 | 1260 |  |
|  | B | D3 | 1260 |  |
| 122 | A | D1 | 1260 |  |
|  | B | D3 | 1260 |  |

TABLE 9

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Cooling end temperature [° C.] | YS [MPa] | TS [MPa] | YR [%] |
| 123 | A | E1 | 1150 | 80 | 830 | 800 | 410 | 469 | 565 | 83 |
|  | B | E1 | 1150 | 80 | 840 | 800 | 360 | 487 | 580 | 84 |
| 124 | A | E2 | 1150 | 80 | 770 | 750 | 350 | 494 | 633 | 78 |
|  | B | E3 | 1150 | 80 | 770 | 760 | 320 | 541 | 652 | 83 |
| 125 | A | E3 | 1150 | 80 | 750 | 740 | 270 | 539 | 682 | 79 |
|  | B | E3 | 1150 | 80 | 740 | 730 | 180 | 528 | 675 | 78 |
| 126 | A | E1 | 1150 | 80 | 800 | 770 | 385 | 456 | 570 | 80 |
|  | B | E2 | 1150 | 80 | 790 | 760 | 410 | 494 | 610 | 81 |
| 127 | A | E1 | 1150 | 80 | 820 | 780 | 400 | 466 | 568 | 82 |
|  | B | E3 | 1150 | 80 | 760 | 740 | 210 | 547 | 692 | 79 |

TABLE 10

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| 128 | A | A4 | 1230 | 80 | 860 | 820 | 570 | 394 | 512 | 77 |
|  | B |  | 1230 | 80 | 860 | 820 | 570 | 397 | 522 | 76 |
| 129 | A | B2 | 1230 | 80 | 860 | 820 | 530 | 386 | 529 | 77 |

TABLE 10-continued

| | | | Hot rolling condition | | | | | Steel sheet | | |
|---|---|---|---|---|---|---|---|---|---|---|
| Test number | Steel pipe A or B | Steel type | Heating temperature [° C.] | Finish rolling reduction [%] | Rolling end temperature [° C.] | Cooling start temperature [° C.] | Coiling temperature [° C.] | YS [MPa] | TS [MPa] | YR [%] |
| | B | | 1230 | 80 | 860 | 820 | 530 | 395 | 541 | 73 |
| 130 | A | C2 | 1230 | 80 | 860 | 820 | 570 | 371 | 501 | 74 |
| | B | | 1230 | 80 | 860 | 820 | 570 | 371 | 515 | 72 |

TABLE 11

| | | Steel pipe | | | | | | | |
|---|---|---|---|---|---|---|---|---|---|
| Test number | Pipe-making method | Outer diameter [mm] | Thickness [mm] | Heat treatment | Coating with thermosetting resin | YS [MPa] | TS [MPa] | YR [%] | Type of SS curve |
| 1 | ERW | 193.7 | 9.53 | None | None | 470 | 553 | 85 | Round |
| | | | | | | 500 | 568 | 88 | Round |
| 2 | ERW | | | None | None | 460 | 541 | 85 | Round |
| | | | | | | 530 | 596 | 89 | Round |
| 3 | ERW | | | None | None | 500 | 556 | 90 | Round |
| | | | | | | 500 | 568 | 88 | Round |
| 4 | ERW | | | None | None | 455 | 506 | 90 | Round |
| | | | | | | 520 | 559 | 93 | Round |
| 5 | ERW | | | None | None | 470 | 553 | 85 | Round |
| | | | | | | 500 | 568 | 88 | Round |
| 6 | ERW | | | None | None | 460 | 489 | 94 | Round |
| | | | | | | 510 | 537 | 95 | Round |
| 7 | ERW | | | None | None | 490 | 505 | 97 | Round |
| | | | | | | 550 | 561 | 98 | Round |
| 8 | ERW | | 10.5 | None | None | 450 | 511 | 88 | Round |
| | | | | | | 510 | 554 | 92 | Round |
| 9 | ERW | | | None | None | 450 | 511 | 88 | Round |
| | | | | | | 490 | 551 | 89 | Round |
| 10 | ERW | | | None | None | 560 | 602 | 93 | Round |
| | | | | | | 590 | 615 | 96 | Round |
| 11 | ERW | | | None | None | 470 | 540 | 87 | Round |
| | | | | | | 520 | 553 | 94 | Round |
| 12 | ERW | 304.8 | 12 | None | None | 470 | 553 | 85 | Round |
| | | | | | | 550 | 625 | 88 | Round |
| 13 | ERW | | | None | None | 460 | 541 | 85 | Round |
| | | | | | | 470 | 553 | 85 | Round |
| 14 | ERW | | | None | None | 510 | 567 | 90 | Round |
| | | | | | | 460 | 517 | 89 | Round |
| 15 | ERW | | | None | None | 530 | 564 | 94 | Round |
| | | | | | | 470 | 534 | 88 | Round |
| 16 | ERW | 323.9 | 17.5 | None | None | 470 | 534 | 88 | Round |
| | | | | | | 500 | 556 | 90 | Round |
| 17 | ERW | | | None | None | 520 | 553 | 94 | Round |
| | | | | | | 540 | 557 | 97 | Round |
| 18 | ERW | | | None | None | 480 | 505 | 95 | Round |
| | | | | | | 540 | 557 | 97 | Round |
| 19 | ERW | | | None | None | 470 | 534 | 88 | Round |
| | | | | | | 500 | 556 | 90 | Round |
| 20 | ERW | | | None | None | 470 | 534 | 88 | Round |
| | | | | | | 500 | 556 | 90 | Round |
| 21 | ERW | | | None | None | 470 | 534 | 88 | Round |
| | | | | | | 500 | 556 | 90 | Round |
| 22 | ERW | 508 | 22 | None | None | 460 | 548 | 84 | Round |
| | | | | | | 480 | 552 | 87 | Round |
| 23 | ERW | | | None | None | 460 | 548 | 84 | Round |
| | | | | | | 520 | 578 | 90 | Round |
| 24 | ERW | | | None | None | 530 | 564 | 94 | Round |
| | | | | | | 470 | 566 | 83 | Round |
| 25 | ERW | | | None | None | 450 | 549 | 82 | Round |
| | | | | | | 470 | 566 | 83 | Round |
| 26 | ERW | | | None | None | 520 | 565 | 92 | Round |
| | | | | | | 530 | 564 | 94 | Round |

TABLE 12

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 27 | ERW | 193.7 | 9.53 | None | None | 450 | 536 | 84 | Round |
| | | | | | | 540 | 614 | 88 | Round |
| 28 | ERW | | | None | None | 480 | 505 | 95 | Round |
| | | | | | | 550 | 625 | 88 | Round |
| 29 | ERW | | | None | None | 450 | 536 | 84 | Round |
| | | | | | | 540 | 614 | 88 | Round |
| 30 | ERW | | | None | None | 550 | 573 | 96 | Round |
| | | | | | | 480 | 500 | 96 | Round |
| 31 | ERW | | | None | None | 450 | 563 | 80 | Round |
| | | | | | | 550 | 598 | 92 | Round |
| 32 | ERW | | | None | None | 450 | 536 | 84 | Round |
| | | | | | | 540 | 621 | 87 | Round |
| 33 | ERW | | 10.5 | None | None | 470 | 500 | 94 | Round |
| | | | | | | 540 | 587 | 92 | Round |
| 34 | ERW | | | None | None | 480 | 500 | 96 | Round |
| | | | | | | 550 | 585 | 94 | Round |
| 35 | ERW | | | None | None | 450 | 542 | 83 | Round |
| | | | | | | 560 | 596 | 94 | Round |
| 36 | ERW | | | None | None | 450 | 500 | 90 | Round |
| | | | | | | 530 | 570 | 93 | Round |
| 37 | ERW | 304.8 | 12 | None | None | 460 | 535 | 86 | Round |
| | | | | | | 550 | 618 | 89 | Round |
| 38 | ERW | | | None | None | 470 | 528 | 89 | Round |
| | | | | | | 550 | 618 | 89 | Round |
| 39 | ERW | | | None | None | 480 | 522 | 92 | Round |
| | | | | | | 550 | 618 | 89 | Round |
| 40 | ERW | 323.9 | 17.5 | None | None | 470 | 534 | 88 | Round |
| | | | | | | 550 | 611 | 90 | Round |
| 41 | ERW | | | None | None | 485 | 533 | 91 | Round |
| | | | | | | 570 | 600 | 95 | Round |
| 42 | ERW | | | None | None | 490 | 510 | 96 | Round |
| | | | | | | 555 | 584 | 95 | Round |
| 43 | ERW | 508 | 22 | None | None | 455 | 506 | 90 | Round |
| | | | | | | 530 | 570 | 93 | Round |
| 44 | ERW | | | None | None | 540 | 568 | 95 | Round |
| | | | | | | 465 | 517 | 90 | Round |
| 45 | ERW | | | None | None | 500 | 532 | 94 | Round |
| | | | | | | 570 | 600 | 95 | Round |

TABLE 13

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 46 | ERW | 193.7 | 9.53 | QT | None | 465 | 554 | 84 | YPE |
| | | | | | | 505 | 587 | 86 | YPE |
| 47 | ERW | | | QT | None | 455 | 529 | 86 | YPE |
| | | | | | | 465 | 541 | 86 | YPE |
| 48 | ERW | | | QT | None | 480 | 558 | 86 | YPE |
| | | | | | | 520 | 591 | 88 | YPE |
| 49 | ERW | | | QT | None | 490 | 563 | 87 | YPE |
| | | | | | | 520 | 578 | 90 | YPE |
| 50 | ERW | | | QT | None | 540 | 587 | 92 | YPE |
| | | | | | | 525 | 590 | 89 | YPE |
| 51 | ERW | | 10.5 | QT | None | 470 | 566 | 83 | YPE |
| | | | | | | 520 | 591 | 88 | YPE |
| 52 | ERW | | | QT | None | 450 | 529 | 85 | YPE |
| | | | | | | 513 | 576 | 89 | YPE |
| 53 | ERW | | | QT | None | 500 | 581 | 86 | YPE |
| | | | | | | 560 | 622 | 90 | YPE |
| 54 | ERW | | | QT | None | 550 | 640 | 86 | YPE |
| | | | | | | 488 | 555 | 88 | YPE |
| 55 | ERW | 304.8 | 12 | QT | None | 448 | 533 | 84 | YPE |
| | | | | | | 512 | 582 | 88 | YPE |
| 56 | ERW | | | QT | None | 460 | 541 | 85 | YPE |
| | | | | | | 470 | 547 | 86 | YPE |
| 57 | ERW | | | QT | None | 498 | 535 | 93 | YPE |
| | | | | | | 547 | 615 | 89 | YPE |

TABLE 13-continued

| Test number | Pipe-making method | Outer diameter [mm] | Thickness [mm] | Heat treatment | Coating with thermosetting resin | YS [MPa] | TS [MPa] | YR [%] | Type of SS curve |
|---|---|---|---|---|---|---|---|---|---|
| 58 | ERW | 323.9 | 17.5 | QT | None | 504 | 573 | 88 | YPE |
|    |     |       |      |    |      | 547 | 615 | 89 | YPE |
| 59 | ERW |       |      | QT | None | 465 | 567 | 82 | YPE |
|    |     |       |      |    |      | 465 | 567 | 82 | YPE |
| 60 | ERW |       |      | QT | None | 455 | 542 | 84 | YPE |
|    |     |       |      |    |      | 520 | 578 | 90 | YPE |
| 61 | ERW |       |      | QT | None | 545 | 606 | 90 | YPE |
|    |     |       |      |    |      | 550 | 598 | 92 | YPE |
| 62 | ERW | 508   | 22   | QT | None | 465 | 547 | 85 | YPE |
|    |     |       |      |    |      | 470 | 540 | 87 | YPE |
| 63 | ERW |       |      | QT | None | 490 | 557 | 88 | YPE |
|    |     |       |      |    |      | 540 | 600 | 90 | YPE |
| 64 | ERW |       |      | QT | None | 467 | 531 | 88 | YPE |
|    |     |       |      |    |      | 530 | 609 | 87 | YPE |
| 65 | ERW |       |      | QT | None | 513 | 597 | 86 | YPE |
|    |     |       |      |    |      | 470 | 566 | 83 | YPE |

TABLE 14

| Test number | Pipe-making method | Outer diameter [mm] | Thickness [mm] | Heat treatment | Coating with thermosetting resin | YS [MPa] | TS [MPa] | YR [%] | Type of SS curve |
|---|---|---|---|---|---|---|---|---|---|
| 66 | ERW | 193.7 | 9.53 | QT | None | 460 | 541 | 85 | YPE |
|    |     |       |      |    |      | 530 | 616 | 86 | YPE |
| 67 | ERW |       |      | QT | None | 490 | 557 | 88 | YPE |
|    |     |       |      |    |      | 555 | 631 | 88 | YPE |
| 68 | ERW |       |      | QT | None | 500 | 538 | 93 | YPE |
|    |     |       |      |    |      | 565 | 595 | 95 | YPE |
| 69 | ERW |       |      | QT | None | 430 | 524 | 82 | YPE |
|    |     |       |      |    |      | 503 | 592 | 85 | YPE |
| 70 | ERW |       | 10.5 | QT | None | 470 | 547 | 86 | YPE |
|    |     |       |      |    |      | 540 | 600 | 90 | YPE |
| 71 | ERW |       |      | QT | None | 490 | 544 | 90 | YPE |
|    |     |       |      |    |      | 562 | 611 | 92 | YPE |
| 72 | ERW |       |      | QT | None | 520 | 571 | 91 | YPE |
|    |     |       |      |    |      | 452 | 526 | 86 | YPE |
| 73 | ERW | 304.8 | 12   | QT | None | 456 | 530 | 86 | YPE |
|    |     |       |      |    |      | 535 | 601 | 89 | YPE |
| 74 | ERW |       |      | QT | None | 472 | 536 | 88 | YPE |
|    |     |       |      |    |      | 542 | 609 | 89 | YPE |
| 75 | ERW |       |      | QT | None | 500 | 543 | 92 | YPE |
|    |     |       |      |    |      | 580 | 617 | 94 | YPE |
| 76 | ERW | 323.9 | 17.5 | QT | None | 482 | 548 | 88 | YPE |
|    |     |       |      |    |      | 550 | 611 | 90 | YPE |
| 77 | ERW |       |      | QT | None | 502 | 534 | 94 | YPE |
|    |     |       |      |    |      | 572 | 602 | 95 | YPE |
| 78 | ERW |       |      | QT | None | 475 | 540 | 88 | YPE |
|    |     |       |      |    |      | 546 | 575 | 95 | YPE |
| 79 | ERW | 508   | 22   | QT | None | 448 | 498 | 90 | YPE |
|    |     |       |      |    |      | 526 | 584 | 90 | YPE |
| 80 | ERW |       |      | QT | None | 462 | 519 | 89 | YPE |
|    |     |       |      |    |      | 546 | 620 | 88 | YPE |
| 81 | ERW |       |      | QT | None | 510 | 567 | 90 | YPE |
|    |     |       |      |    |      | 584 | 615 | 95 | YPE |

TABLE 15

| Test number | Pipe-making method | Outer diameter [mm] | Thickness [mm] | Heat treatment | Coating with thermosetting resin | YS [MPa] | TS [MPa] | YR [%] | Type of SS curve |
|---|---|---|---|---|---|---|---|---|---|
| 82 | ERW | 193.7 | 9.53 | Aging treatment | None | 488 | 555 | 88 | YPE |
|    |     |       |      |                 |      | 490 | 557 | 88 | YPE |

TABLE 15-continued

| Test number | Pipe-making method | Outer diameter [mm] | Thickness [mm] | Heat treatment | Coating with thermosetting resin | YS [MPa] | TS [MPa] | YR [%] | Type of SS curve |
|---|---|---|---|---|---|---|---|---|---|
| 83 | ERW | | | Aging treatment | None | 505<br>560 | 555<br>596 | 91<br>94 | YPE<br>YPE |
| 84 | ERW | | 10.5 | Aging treatment | None | 530<br>582 | 558<br>606 | 95<br>96 | YPE<br>YPE |
| 85 | ERW | | | Aging treatment | None | 542<br>555 | 609<br>617 | 89<br>90 | YPE<br>YPE |
| 86 | ERW | 304.8 | 12 | Tempering | None | 536<br>586 | 602<br>617 | 89<br>95 | YPE<br>YPE |
| 87 | ERW | | | Tempering | None | 472<br>527 | 513<br>561 | 92<br>94 | YPE<br>YPE |
| 88 | ERW | 323.9 | 17.5 | Aging treatment | None | 568<br>546 | 592<br>581 | 96<br>94 | YPE<br>YPE |
| 89 | ERW | | | Aging treatment | None | 460<br>465 | 517<br>511 | 89<br>91 | YPE<br>YPE |
| 90 | ERW | 508 | 22 | Aging treatment | None | 560<br>578 | 571<br>602 | 98<br>96 | YPE<br>YPE |
| 91 | ERW | | | Aging treatment | None | 513<br>470 | 597<br>566 | 86<br>83 | YPE<br>YPE |
| 92 | ERW | 193.7 | 9.53 | Aging treatment | None | 489<br>570 | 537<br>640 | 91<br>89 | YPE<br>YPE |
| 93 | ERW | | | Aging treatment | None | 490<br>560 | 505<br>571 | 97<br>98 | YPE<br>YPE |
| 94 | ERW | | 10.5 | Aging treatment | None | 460<br>525 | 484<br>553 | 95<br>95 | YPE<br>YPE |
| 95 | ERW | | | Aging treatment | None | 506<br>589 | 538<br>601 | 94<br>98 | YPE<br>YPE |
| 96 | ERW | | | Aging treatment | None | 520<br>452 | 571<br>526 | 91<br>86 | YPE<br>YPE |
| 97 | ERW | 304.8 | 12 | Aging treatment | None | 514<br>584 | 578<br>615 | 89<br>95 | YPE<br>YPE |
| 98 | ERW | | | Aging treatment | None | 499<br>590 | 542<br>608 | 92<br>97 | YPE<br>YPE |
| 99 | ERW | 323.9 | 17.5 | Aging treatment | None | 503<br>572 | 572<br>602 | 88<br>95 | YPE<br>YPE |
| 100 | ERW | | | Aging treatment | None | 536<br>600 | 570<br>632 | 94<br>95 | YPE<br>YPE |
| 101 | ERW | 508 | 22 | Tempering | None | 521<br>589 | 566<br>627 | 92<br>94 | YPE<br>YPE |
| 102 | ERW | | | Tempering | None | 508<br>584 | 524<br>664 | 97<br>88 | YPE<br>YPE |
| 103 | ERW | 193.7 | 10.5 | None | Existing | 520<br>575 | 550<br>600 | 95<br>96 | YPE<br>YPE |
| 104 | ERW | 304.8 | 12 | None | Existing | 470<br>520 | 515<br>555 | 91<br>94 | YPE<br>YPE |
| 105 | ERW | 508 | 22 | None | Existing | 551<br>570 | 568<br>605 | 97<br>94 | YPE<br>YPE |

TABLE 16

| Test number | Pipe-making method | Outer diameter [mm] | Thickness [mm] | Heat treatment | Coating with thermosetting resin | YS [MPa] | TS [MPa] | YR [%] | Type of SS curve |
|---|---|---|---|---|---|---|---|---|---|
| 106 | ERW | 508 | 22 | None | None | 420<br>456 | 500<br>524 | 84<br>87 | Round<br>Round |
| 107 | ERW | | | None | None | 440<br>505 | 512<br>561 | 86<br>90 | Round<br>Round |
| 108 | ERW | | | None | None | 480<br>510 | 539<br>554 | 89<br>92 | Round<br>Round |
| 109 | ERW | | | None | None | 460<br>530 | 489<br>564 | 94<br>94 | Round<br>Round |
| 110 | ERW | | | None | None | 462<br>540 | 486<br>600 | 95<br>90 | Round<br>Round |
| 111 | ERW | 323.9 | 17.5 | None | None | 590<br>640 | 670<br>711 | 88<br>90 | Round<br>Round |
| 112 | ERW | | | None | None | 600<br>620 | 652<br>660 | 92<br>94 | Round<br>Round |
| 113 | ERW | 508 | 22 | None | None | 570<br>645 | 648<br>694 | 88<br>93 | Round<br>Round |

TABLE 16-continued

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 114 | ERW | | | None | None | 525 | 597 | 88 | Round |
| | | | | | | 530 | 589 | 90 | Round |
| 115 | ERW | | | None | None | 625 | 665 | 94 | Round |
| | | | | | | 564 | 641 | 88 | Round |
| 116 | ERW | 323.9 | 17.5 | None | None | 565 | 614 | 92 | Round |
| | | | | | | 640 | 681 | 94 | Round |
| 117 | ERW | | | None | None | 572 | 636 | 90 | Round |
| | | | | | | 652 | 686 | 95 | Round |
| 118 | ERW | 508 | 22 | None | None | 600 | 652 | 92 | Round |
| | | | | | | 680 | 723 | 94 | Round |
| 119 | ERW | | | None | None | 612 | 658 | 93 | Round |
| | | | | | | 686 | 738 | 93 | Round |

TABLE 17

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 120 | SML | 304.8 | 12 | 930° CQ | None | 515 | 602 | 86 | YPE |
| | | | | 650° CT | | 520 | 607 | 86 | YPE |
| 121 | SML | | | 930° CQ | None | 551 | 636 | 87 | YPE |
| | | | | 580° CT | | 598 | 698 | 86 | YPE |
| 122 | SML | | | 930° CQ | None | 522 | 606 | 86 | YPE |
| | | | | 650° CT | | 593 | 676 | 88 | YPE |

TABLE 18

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 123 | UOE | 508 | 22 | None | None | 507 | 582 | 87 | Round |
| | | | | | | 532 | 602 | 88 | Round |
| 124 | UOE | | | None | None | 587 | 647 | 91 | Round |
| | | | | | | 597 | 672 | 89 | Round |
| 125 | UOE | | | None | None | 640 | 700 | 91 | Round |
| | | | | | | 634 | 695 | 91 | Round |
| 126 | UOE | | | None | None | 523 | 593 | 88 | Round |
| | | | | | | 556 | 631 | 88 | Round |
| 127 | UOE | | | None | None | 516 | 591 | 87 | Round |
| | | | | | | 627 | 707 | 89 | Round |

TABLE 19

| Test number | Steel pipe | | | | | | | | |
|---|---|---|---|---|---|---|---|---|---|
| | Pipe-making method | Outer diameter [mm] | Thickness [mm] | Heat treatment | Coating with thermosetting resin | YS [MPa] | TS [MPa] | YR [%] | Type of SS curve |
| 128 | ERW | 193.7 | 9.53 | None | None | 510 | 537 | 95 | Round |
| | | | | | | 482 | 550 | 88 | Round |
| 129 | ERW | 304.8 | 12 | None | None | 470 | 553 | 85 | Round |
| | | | | | | 510 | 567 | 90 | Round |
| 130 | ERW | 508 | 22 | None | None | 469 | 534 | 88 | Round |
| | | | | | | 455 | 548 | 83 | Round |

TABLE 20

| Test number | Bed diameter [mm] | Right side of Expression (2) | ΔYS [MPa] | Test result | Remarks |
|---|---|---|---|---|---|
| 1 | 7500 | 81 | 30 | Not fractured | Example |
| 2 | 7500 | 81 | 70 | Not fractured | |
| 3 | 7500 | 73 | 0 | Not fractured | |
| 4 | 7500 | 73 | 65 | Not fractured | |
| 5 | 7500 | 81 | 30 | Not fractured | |
| 6 | 7500 | 66 | 50 | Not fractured | |
| 7 | 7500 | 60 | 60 | Not fractured | |
| 8 | 7500 | 76 | 60 | Not fractured | |
| 9 | 7500 | 76 | 40 | Not fractured | |
| 10 | 7500 | 67 | 30 | Not fractured | |
| 11 | 9000 | 78 | 50 | Not fractured | |
| 12 | 10000 | 81 | 80 | Not fractured | |
| 13 | 10000 | 81 | 10 | Not fractured | |
| 14 | 10000 | 74 | 50 | Not fractured | |
| 15 | 10000 | 76 | 60 | Not fractured | |
| 16 | 15000 | 76 | 30 | Not fractured | |
| 17 | 15000 | 66 | 20 | Not fractured | |
| 18 | 15000 | 64 | 60 | Not fractured | |
| 19 | 15000 | 76 | 30 | Not fractured | |
| 20 | 15000 | 76 | 30 | Not fractured | |
| 21 | 15000 | 76 | 30 | Not fractured | |
| 22 | 15000 | 83 | 20 | Not fractured | |
| 23 | 15000 | 83 | 60 | Not fractured | |
| 24 | 15000 | 85 | 60 | Not fractured | |
| 25 | 15000 | 87 | 20 | Not fractured | |
| 26 | 15000 | 69 | 10 | Not fractured | |

TABLE 21

| Test number | Bed diameter [mm] | Right side of Expression (2) | ΔYS [MPa] | Test result | Remarks |
|---|---|---|---|---|---|
| 27 | 7500 | 83 | 90 | fractured | Comparative example |
| 28 | 7500 | 64 | 70 | fractured | |
| 29 | 7500 | 83 | 90 | fractured | |
| 30 | 7500 | 62 | 70 | fractured | |
| 31 | 7500 | 90 | 100 | fractured | |
| 32 | 7500 | 83 | 90 | fractured | |
| 33 | 7500 | 66 | 70 | fractured | |
| 34 | 7500 | 62 | 70 | fractured | |
| 35 | 7500 | 85 | 110 | fractured | |
| 36 | 7500 | 73 | 80 | fractured | |
| 37 | 10000 | 80 | 90 | fractured | |
| 38 | 10000 | 74 | 80 | fractured | |
| 39 | 10000 | 69 | 70 | fractured | |
| 40 | 15000 | 76 | 80 | fractured | |
| 41 | 15000 | 71 | 85 | fractured | |
| 42 | 15000 | 62 | 65 | fractured | |
| 43 | 15000 | 73 | 75 | fractured | |
| 44 | 15000 | 73 | 75 | fractured | |
| 45 | 15000 | 66 | 70 | fractured | |

TABLE 22

| Test number | Bed diameter [mm] | Right side of Expression (6) | ΔYS [MPa] | Test result | Remarks |
|---|---|---|---|---|---|
| 46 | 7500 | 67 | 40 | Not fractured | Example |
| 47 | 7500 | 66 | 10 | Not fractured | |
| 48 | 7500 | 66 | 40 | Not fractured | |
| 49 | 7500 | 65 | 30 | Not fractured | |
| 50 | 7500 | 64 | 15 | Not fractured | |
| 51 | 7500 | 68 | 50 | Not fractured | |
| 52 | 7500 | 66 | 63 | Not fractured | |
| 53 | 7500 | 66 | 60 | Not fractured | |
| 54 | 9000 | 64 | 62 | Not fractured | |
| 55 | 10000 | 67 | 64 | Not fractured | |
| 56 | 10000 | 66 | 10 | Not fractured | |
| 57 | 10000 | 61 | 49 | Not fractured | |
| 58 | 15000 | 64 | 43 | Not fractured | |
| 59 | 15000 | 68 | 0 | Not fractured | |
| 60 | 15000 | 67 | 65 | Not fractured | |
| 61 | 15000 | 63 | 5 | Not fractured | |
| 62 | 15000 | 66 | 5 | Not fractured | |
| 63 | 15000 | 64 | 50 | Not fractured | |
| 64 | 15000 | 64 | 63 | Not fractured | |
| 65 | 15000 | 68 | 43 | Not fractured | |

TABLE 23

| Test number | Bed diameter [mm] | Right side of Expression (6) | ΔYS [MPa] | Test result | Remarks |
|---|---|---|---|---|---|
| 66 | 7500 | 66 | 70 | fractured | Comparative example |
| 67 | 7500 | 64 | 65 | fractured | |
| 68 | 7500 | 61 | 65 | fractured | |
| 69 | 7500 | 68 | 73 | fractured | |
| 70 | 7500 | 66 | 70 | fractured | |
| 71 | 7500 | 63 | 72 | fractured | |
| 72 | 7500 | 66 | 68 | fractured | |
| 73 | 10000 | 66 | 79 | fractured | |
| 74 | 10000 | 64 | 70 | fractured | |
| 75 | 10000 | 62 | 80 | fractured | |
| 76 | 15000 | 64 | 68 | fractured | |
| 77 | 15000 | 60 | 70 | fractured | |

TABLE 23-continued

| Test number | Bed diameter [mm] | Right side of Expression (6) | ΔYS [MPa] | Test result | Remarks |
|---|---|---|---|---|---|
| 78 | 15000 | 64 | 71 | fractured | |
| 79 | 15000 | 63 | 78 | fractured | |
| 80 | 15000 | 64 | 84 | fractured | |
| 81 | 15000 | 63 | 74 | fractured | |

TABLE 24

| Test number | Bed diameter [mm] | Right side of Expression (6) | ΔYS [MPa] | Test result | Remarks |
|---|---|---|---|---|---|
| 82 | 7500 | 64 | 2 | Not fractured | Example |
| 83 | 7500 | 62 | 55 | Not fractured | |
| 84 | 7500 | 59 | 52 | Not fractured | |
| 85 | 7500 | 64 | 13 | Not fractured | |
| 86 | 10000 | 64 | 50 | Not fractured | |
| 87 | 10000 | 62 | 55 | Not fractured | |
| 88 | 15000 | 60 | 22 | Not fractured | |
| 89 | 15000 | 64 | 5 | Not fractured | |
| 90 | 15000 | 57 | 18 | Not fractured | |
| 91 | 15000 | 68 | 43 | Not fractured | |
| 92 | 7500 | 62 | 81 | fractured | Comparative example |
| 93 | 7500 | 58 | 70 | fractured | |
| 94 | 7500 | 59 | 65 | fractured | |
| 95 | 7500 | 60 | 83 | fractured | |
| 96 | 7500 | 66 | 68 | fractured | |
| 97 | 10000 | 64 | 70 | fractured | |
| 98 | 10000 | 62 | 91 | fractured | |
| 99 | 15000 | 64 | 69 | fractured | |
| 100 | 15000 | 60 | 64 | fractured | |
| 101 | 15000 | 62 | 68 | fractured | |
| 102 | 15000 | 58 | 76 | fractured | |
| 103 | 7500 | 59 | 55 | Not fractured | Example |
| 104 | 10000 | 62 | 50 | Not fractured | |
| 105 | 15000 | 58 | 19 | Not fractured | |

TABLE 25

| Test number | Bed diameter [mm] | Right side of Expression (2) | ΔYS [MPa] | Test result | Remarks |
|---|---|---|---|---|---|
| 106 | 15000 | 83 | 36 | Not fractured | Example |
| 107 | 15000 | 80 | 65 | Not fractured | |
| 108 | 15000 | 74 | 30 | Not fractured | |
| 109 | 15000 | 66 | 70 | fractured | Comparative example |
| 110 | 15000 | 64 | 78 | fractured | |
| 111 | 15000 | 76 | 50 | Not fractured | Example |
| 112 | 15000 | 69 | 20 | Not fractured | |
| 113 | 15000 | 76 | 75 | Not fractured | |
| 114 | 15000 | 76 | 5 | Not fractured | |

TABLE 25-continued

| Test number | Bed diameter [mm] | Right side of Expression (2) | ΔYS [MPa] | Test result | Remarks |
|---|---|---|---|---|---|
| 115 | 15000 | 76 | 61 | Not fractured | |
| 116 | 15000 | 69 | 75 | fractured | Comparative example |
| 117 | 15000 | 73 | 80 | fractured | |
| 118 | 15000 | 69 | 80 | fractured | |
| 119 | 15000 | 67 | 74 | fractured | |

TABLE 26

| Test number | Bed diameter [mm] | Right side of Expression (6) | ΔYS [MPa] | Test result | Remarks |
|---|---|---|---|---|---|
| 120 | 10000 | 66 | 5 | Not fractured | Example |
| 121 | 10000 | 65 | 47 | Not fractured | |
| 122 | 10000 | 66 | 71 | fractured | Comparative example |

TABLE 27

| Test number | Bed diameter [mm] | Right side of Expression (2) | ΔYS [MPa] | Test result | Remarks |
|---|---|---|---|---|---|
| 123 | 15000 | 78 | 25 | Not fractured | Example |
| 124 | 15000 | 71 | 10 | Not fractured | |
| 125 | 15000 | 70 | 6 | Not fractured | |
| 126 | 15000 | 76 | 33 | Not fractured | |
| 127 | 15000 | 77 | 111 | fractured | Comparative example |

TABLE 28

| Test number | Bed diameter [mm] | Production number | Right side of Expression (2) | ΔYS [MPa] | Test result | Remarks |
|---|---|---|---|---|---|---|
| 128 | 7500 | X + 1, X + 3 | 76 | 28 | Not fractured | Example |
| 129 | 10000 | Y + 1, Y + 2 | 81 | 40 | Not fractured | |
| 130 | 15000 | Z + 1, Z + 4 | 85 | 14 | Not fractured | |

INDUSTRIAL APPLICABILITY

According to the present invention, it is possible to provide the pipeline in which the deformation properties of the steel pipe are sufficiently exhibited and thus, the present invention very remarkably contributes to the industry.

BRIEF DESCRIPTION OF THE REFERENCE SYMBOLS

1: PIPELINE
2, A, B: STEEL PIPE
3: WELD ZONE
4: DRUM

5: HEAT AFFECTED ZONE (HAZ)
10: TESTING APPARATUS
11: UNBENDING BED
12: BENDING BED
13: BENDING LOAD

The invention claimed is:

1. A pipeline comprising a plurality of weld zones where ends of a plurality of steel pipes are joined by welding, wherein:
the plurality of the steel pipes are produced from a plurality of charges of molten steel having one or more steel compositions, by mass %,
C: 0.04% or more and 0.15% or less,
Mn: 1.0% or more and 1.75% or less,
Nb: 0.005% or more and 0.10% or less,
Ti: 0.005% or more and 0.02% or less,
Al: 0.001% or more and 0.06% or less,
Si: limited to 0.4% or less,
P: limited to 0.015% or less,
S: limited to 0.005% or less,
N: limited to 0.007% or less, and
Cu: 0.1% or more and 1.0% or less,
Ni: 0.1% or more and 1.0% or less,
Cr: 0.1% or more and 1.0% or less,
Mo: 0.05% or more and 0.3% or less, and
V: 0.01% or more and 0.1% or less, and
a balance consisting of Fe and unavoidable impurities,
a yield point elongation is present on a stress-strain curve that is obtained when stress is applied in a longitudinal direction of each of the steel pipes;
t which is a thickness of each of the steel pipes in units of mm and D which is an average pipe outside-diameter in units of mm satisfy a following Expression 5;
$\Delta YS$ which is a yield strength difference between one steel pipe and the other steel pipe that are welded to each other in units of MPa, and YR which represents a yield ratio that is a ratio of the yield strength to a tensile strength of a pipe having a low yield strength out of the one steel pipe and the other steel pipe, satisfy a following Expression 6:

$$t/D \times 100 \leq 6 \quad (5)$$

$$\Delta YS \leq -0.69 \times YR + 125 \quad (6),$$

wherein a $\Delta Ceq$ value which is an absolute value of a difference of Ceq values expressed by a following Expression 8 between the one steel pipe and the other steel pipe is 0.045% or less, and
the tensile strength of the plurality of the steel pipes is 450 MPa to 850 MPa or less, $$Ceq = [C] + [Mn]/6 + ([Ni] + [Cu])/15 + ([Cr] + [Mo] + [V])/5 \quad (8)$$

wherein [C], [Mn], [Ni], [Cu], [Cr], [Mo], and [V] represent amounts of C, Mn, Ni, Cu, Cr, Mo, and V by mass %.

2. The pipeline according to claim 1, wherein front and rear surfaces of the plurality of the steel pipes are coated with thermosetting resin.

3. A method of producing the pipeline according to claim 1, comprising:
a second yield strength measuring process in which the yield strength of the plurality of the steel pipes is measured; and
a third welding process in which steel pipes in which the $\Delta YS$ satisfies the Expression 6 are welded.

4. A method of producing the pipeline according to claim 1, comprising:
a second assigning process in which production numbers capable of specifying each of the steel pipes are assigned to the plurality of the steel pipes in order of rolling; and
a forth welding process in which steel pipes produced from the same molten steel and having a difference between the production numbers of 1 or more and 5 or less are welded.

5. A pipeline comprising a plurality of weld zones where ends of a plurality of steel pipes are joined by welding, wherein:
the plurality of the steel pipes are produced from a plurality of charges of molten steel having one or more steel compositions, by mass %,
C: 0.04% or more and 0.15% or less,
Mn: 1.0% or more and 1.75% or less,
Nb: 0.005% or more and 0.10% or less,
Ti: 0.005% or more and 0.02% or less,
Al: 0.001% or more and 0.06% or less,
Si: limited to 0.4% or less,
P: limited to 0.015% or less,
S: limited to 0.005% or less,
N: limited to 0.007% or less, and
Cu: 0.1% or more and 1.0% or less,
Ni: 0.1% or more and 1.0% or less,
Cr: 0.1% or more and 1.0% or less,
Mo: 0.05% or more and 0.3% or less, and
V: 0.01% or more and 0.1% or less, and
a balance comprising Fe and unavoidable impurities,
a yield point elongation is present on a stress-strain curve that is obtained when stress is applied in a longitudinal direction of each of the steel pipes;
t which is a thickness of each of the steel pipes in units of mm and D which is an average pipe outside-diameter in units of mm satisfy a following Expression 5;
$\Delta YS$ which is a yield strength difference between one steel pipe and the other steel pipe that are welded to each other in units of MPa, and YR which represents a yield ratio that is a ratio of the yield strength to a tensile strength of a pipe having a low yield strength out of the one steel pipe and the other steel pipe, satisfy a following Expression 6:

$$t/D \times 100 \leq 6 \quad (5)$$

$$\Delta YS \leq -0.69 \times YR + 125 \quad (6),$$

wherein a $\Delta Ceq$ value which is an absolute value of a difference of Ceq values expressed by a following Expression 8 between the one steel pipe and the other steel pipe is 0.045% or less, and
the tensile strength of the plurality of the steel pipes is 450 MPa to 850 MPa or less, $$Ceq = [C] + [Mn]/6 + ([Ni] + [Cu])/15 + ([Cr] + [Mo] + [V])/5 \quad (8)$$

wherein [C], [Mn], [Ni], [Cu], [Cr], [Mo], and [V] represent amounts of C, Mn, Ni, Cu, Cr, Mo, and V by mass %.

* * * * *